(12) United States Patent
Ueno

(10) Patent No.: US 7,010,235 B2
(45) Date of Patent: Mar. 7, 2006

(54) METHOD AND SYSTEM FOR ALL-OPTICAL SIGNAL REGENERATION

(75) Inventor: Yoshiyasu Ueno, Tokyo (JP)

(73) Assignee: NEC Corporation, (JP)

( * ) Notice: Subject to any disclaimer, the term of this patent is extended or adjusted under 35 U.S.C. 154(b) by 884 days.

(21) Appl. No.: 10/060,324

(22) Filed: Feb. 1, 2002

(65) Prior Publication Data

US 2002/0105706 A1 Aug. 8, 2002

(30) Foreign Application Priority Data

Feb. 2, 2001 (JP) ............................. 2001-027478

(51) Int. Cl.
*H04B 10/02* (2006.01)
(52) U.S. Cl. ..................... 398/178; 398/173; 398/175; 398/149; 398/102; 398/161; 385/15
(58) Field of Classification Search ........ 398/173–181, 398/149, 102, 161; 385/15
See application file for complete search history.

(56) References Cited

U.S. PATENT DOCUMENTS 6,807,379 B1 * 10/2004 Brindel et al. .............. 398/175
2001/0021288 A1 * 9/2001 Watanabe et al. ............. 385/15

OTHER PUBLICATIONS

Nakamura et al., "Optical Amplifiers and Their Applications," Technical Digest, Jul. 9-12, 2000, pp. PD4-1 to PD4-3.
Billes et al., "IOOC-ECOC97", 11th International Conference on Integrated Optics and Optical Fibre Communications , 23rd European Conference on Optical Communications, Sep. 23, 1997, pp. 269-272, vol. 2, Edinburgh, Scotland.

Philips et al., "40Gbit/s all-optical data regeneration and demultiplexing with long pattern lengths using a semiconductor nonlinear interferometer," Electronics Letters, Nov. 26, 1998, pp. 2340-2342; vol. 34, No. 24.
Kelly et al., "80Gbit/s all-optical data regenerative wavelength conversion a semiconductor optical amplifier based interferometer," Electronic Letters, Aug. 19, 1999, pp. 1477-1478, vol. 35, No. 17.
Ueno et al., "3.8-THz Wavelength Conversion of Picosecond Pulses Using a Semiconductor Delayed-Interference Signal-Wavelength Converter (DISC)," IEEE Photonics Technology Letters, Mar. 3, 1998, pp. 346-348, vol. 10, No. 3.

(Continued)

*Primary Examiner*—M. R. Sedighian
*Assistant Examiner*—David Lee
(74) *Attorney, Agent, or Firm*—Dickstein, Shapiro, Morin & Oshinsky, LLP.

(57) ABSTRACT

A system for all-optical signal regeneration is provided, which makes it possible to exhibit desired intensity noise suppressing function with respect to pulsed input signal light without increasing the injection current of semiconductor optical amplifiers even if the magnitude of nonlinear phase shift of the input signal light is less than $\pi$. The output light of the first delay interference unit is subjected to phase shift in the first nonlinear semiconductor waveguide and then, applied to the second delay interference unit along with the clock light. In the second delay interference unit, the first interfered light is generated from the output light while the second interfered light is generated from the clock light having an opposite logic to the input light. The second interfered light is subjected to phase shift by the first interfered light in the second nonlinear semiconductor waveguide and then, applied to the third delay interference unit. The third interfered light having an opposite logic to the input light is generated from the second interfered light in the third delay interference unit. The third interfered light is the output light of the system.

26 Claims, 10 Drawing Sheets

OTHER PUBLICATIONS

Leuthold et al., "100 Gbit/s All-Optical Wavelength Conversion with an Integrated SOA Delayed-Interference Configuration," Technical Digest of Optical Amplifiers and Their Applications, OAA, Jul. 9-12, 2000, pp. 284-286, Quebec, Canada.

Mikkelsen et al., "All-optical noise reduction capability of interferometric wavelength converters," Electronics Letters, Mar. 14, 1996, pp. 566-567, vol. 32, No. 6.

Wolfson et al., "Experimental and Theoretical Investigation of the Regenerative Capabilities of Electrooptic and All-Optical Interferometric Wavelength Converters," IEEE Photonics Technology Letters, Oct. 10, 1998, pp. 1413-1415, vol. 10, No. 10.

Nakamura et al., "Ultra-high -speed all-optical switching using semiconductor optical amplifiers," Technical Digest of Optical Amplifiers and Their Applications, OAA, Jul. 9-12, 2000, pp. 281-283, Quebec, Canada.

* cited by examiner

INPUT SIGNAL LIGHT $S_{IN}$ (WAVELENGTH: $\lambda 1$)

2ND OUTPUT LIGHT $S_{6a}$ (WAVELENGTH: $\lambda 2$)

OUTPUT LIGHT $S_9$ (WAVELENGTH: $\lambda 1$)
(4TH OUTPUT LIGHT)

1ST CLOCK LIGHT (WAVELENGTH: $\lambda 2$)
2ND CLOCK LIGHT (WAVELENGTH: $\lambda 1$)

1ST OUTPUT LIGHT

INPUT SIGNAL LIGHT $S_{IN}$ (WAVELENGTH: $\lambda 1$)

1ST OUTPUT LIGHT $S_{43a}$ (WAVELENGTH: $\lambda 2$)
(DISTORTED CONTINUOUS-WAVE LIGHT)

OUTPUT LIGHT $S_{46b}$ (WAVELENGTH: $\lambda 1$)
(3RD OUTPUT LIGHT)

METHOD AND SYSTEM FOR ALL-OPTICAL SIGNAL REGENERATION

BACKGROUND OF THE INVENTION

1. Field of the Invention

The present invention relates to a technique for all-optical signal regeneration used to repeat or regenerate signal light transmitted in digital optical communication networks. More particularly, the invention relates to a method and a system for all-optical signal regeneration that eliminate various types of distortion and noise added to the pulsed signal light or optical signal pulses throughout transmission, thereby regenerating signal light pulses having the same waveform, intensity, and timing (or, the same waveform and intensity) as the incident or input signal light pulses at the transmission end through optical signal processing.

2. Description of the Related Art

With existing optical communications systems, it is popular to use the conventional repeating method that repeats the intensity of pulsed signal light during transmission with optical fiber amplifiers. As these optical fiber amplifiers, for example, Erbium-Doped Fiber Amplifiers (EDFAs) are typically used. This conventional repeating method has an advantage that data or signal transmission can be carried out without conversion between optical signals and electrical signals. Thus, this method is suitable to large-capacity optical communications systems.

With the conventional repeating method using optical fiber amplifiers, however, there is a disadvantage that the Signal to Noise Ratio (S/N) degrades as the transmission distance increases. This disadvantage is caused by the fact that noise induced by Amplified Spontaneous Emission (ASE) occurring in the amplifiers (i.e., ASE noise) tends to be superposed on the signal light transmitted. As a result, the possible, maximum transmission distance is limited.

To cope with the above-described disadvantage, in other words, to suppress effectively the S/N degradation due to the ASE noise, application of the "optical 3R repeating" or "optical 2R repeating" method has been studied so far.

The "optical 3R repeating" is a method of repeating a digital or pulsed signal light by regenerating pulsed light which is the same in waveform, intensity, and timing as the initial signal light at the transmitting end through optical signal processing. This method includes "Reamplifying", "Reshaping", and "Retiming" processes and therefore, it is termed the "optical 3R repeating" method. "Reamplifying" means the amplifying process of the signal waveform distorted, in other words, the raising process of the signal level. "Reshaping" means the shaping process of the signal waveform distorted to facilitate discrimination of the signal from noise. "Retiming" means the timing process of the signal waveform amplified and shaped to correct the timing of the signal pulses, and the control process of controlling the width and phase of the signal pulses.

On the other hand, the "optical 2R repeating" is a method of repeating a pulsed signal light by regenerating pulsed light which are the same in waveform and intensity as the pulsed initial light at the transmitting end through optical signal processing. Thus, the "optical 2R repeating" method is different from the "optical 3R repeating" method in that the "Retiming" process is not carried out.

With the "optical 3R repeating" method, optical clock (i.e., pulsed clock light) is extracted from the sequence of pulses of the signal light inputted and then, the clock light thus extracted and the signal light are subjected to the "AND" processing, thereby regenerating or repeating pulsed signal light. In this way, a similar signal processing to the conventional repeating method that includes optical to electrical conversion and/or electrical to optical conversion is performed for the signal light and the clock light at high speed with the use of known optical signal processing techniques.

On the other hand, with the "optical 2R repeating" method, the ASE noise, which is superposed on the signal light in the optical amplifier, is suppressed with optical noise-suppressing elements or devices. Thus, the level of S/N is returned to its initial one for repeating the signal light.

In recent years, various types of all-optical signal regenerator systems have been developed and disclosed to realize the "optical 3R or 2R repeating" method explained above.

For example, Nakamura et al. disclosed an optical 3R regenerator system in the Digest of Optical Amplifiers and their Applications, OAA 2000, Jul. 9–12, 2000, Quebec, Canada, PD4-1 to 4. This system includes symmetrical Mach-Zehnder-type optical switches, each of which is formed by combination of Semiconductor Optical Amplifiers (SOAs) and optical interferometers.

Billes et al. disclosed an optical 3R regenerator system in the Digest of 23rd European Conference on Optical Communications, EOOC '97, Sep. 22–25, 1997, Edinburgh, Scotland, Vol. 2, pp. 269–272. This system includes Mach-Zehnder-type interferometers with SOAs.

Philips et al. disclosed an optical 3R regenerator system of the symmetrical Mach-Zehnder-type comprising SOAs and optical interferometers in Electronics Letters, Vol. 34, No. 24, pp. 2340–2342, 1998.

Kelly et al. disclosed an optical 3R regenerator system of the symmetrical Mach-Zehnder-type comprising SOAs and optical interferometers in Electronics Letters, Vol. 35, No. 17, pp. 1477–1478, August 1999.

Ueno disclosed a DISC-type wavelength converter in IEEE Photonics Letters, No. 10, pp. 346–348, 1998. This converter serves as an optical 2R regenerator system.

Leuthold et al. disclosed a DISC-type wavelength converter in the Digest of Optical Amplifiers and their Applications, OAA 2000, Jul. 9–12, 2000, Quebec, Canada, QWD3-1, pp. 186–188. This converter serves as an optical 2R regenerator system.

All of the prior-art optical 3R and 2R regenerator or repeater systems described above have a function to remove the intensity noise of signal light (i.e., ASE noise superposed on the signal light in the optical fiber amplifier provided in the repeater in the transmission path). However, to exhibit the function of suppressing the intensity noise in the signal light, these prior-art systems must satisfy the condition or requirement that the magnitude of the nonlinear phase shift of the signal light, which is caused by the SOAs built in the systems, is equal to $\pi$ (=180°). This is a known fact. For example, Electronics Letters, Vol. 32, No. 6, pp 566–567, March 1996 and IEEE Photonics Technology Letters, Vol. 10, No. 10, pp. 1413–1415 reported the same.

With the above-described prior-art 3R or 2R regenerator systems, when the bit rate (i.e., the repetition frequency) of the optical signal pulses inputted is very high, for example, the bit rate is 100 GHz or higher, the injection current of the SOA is set as much as approximately 100 mA, to 300 mA. In this case, the nonlinear phase shift applied to the optical signal pulses is approximately $0.3\pi$ at most. For this reason, a problem that desired intensity-noise suppressing function is insufficiently exhibited will occur.

This problem can be solved if the injection current of the SOA is increased. In this case, however, there arises another problem that not only the power consumption of the SOA but also the power consumption of Peltier coolers for cooling the SOA themselves increase.

Moreover, with the above-described prior-art 3R or 2R regenerator systems, there is a problem that it is difficult to equalize the wavelength of the pulsed output light (i.e., the output light for regeneration or repeating) to that of the pulsed input signal light.

SUMMARY OF THE INVENTION

Accordingly, an object of the present invention is to provide a method and a system for all-optical signal regeneration that make it possible to exhibit desired intensity-noise suppressing function with respect to pulsed input signal light without increasing the injection current of a semiconductor optical amplifier (SOA) even if the magnitude of nonlinear phase shift of the input signal light is less than π.

Another object of the present invention is to provide a method and a system for all-optical signal regeneration that suppress the ASE noise to thereby improve the S/N in optical communications systems.

Still another object of the present invention is to provide a method and a system for all-optical signal regeneration that suppress the optical noise superposed on the pulsed input signal light not only at the "0" level with relatively lower intensity but also at the "1" level with relatively higher intensity.

A further object of the present invention is to provide a method and a system for all-optical signal regeneration that suppress the beat noise between the signal light and the ASE light.

A still further object of the present invention is to provide a method and a system for all-optical signal regeneration that can equalize the wavelength of the pulsed output light (i.e., the regenerated light) to that of the input signal light.

The above objects together with others not specifically mentioned will become clear to those skilled in the art from the following description.

According to a first aspect of the invention, a method for all-optical signal regeneration is provided. This method comprises:

(a) inputting pulsed input signal light with a first wavelength into first nonlinear semiconductor waveguide means to cause nonlinear change of refractive index therein;

(b) generating first pulsed clock light and second pulsed clock light by extracting optical clock from the input signal light;
 the first clock light having a second wavelength different from the first wavelength;
 the second clock light having the first wavelength;

(c) dividing the first optical clock into a first component and a second component and generating a first delay time between the first component and the second component, thereby generating first pulsed output light including the first component and the second component;
 the first output light having the second wavelength;

(d) applying the first output light to the first nonlinear semiconductor waveguide means to cause nonlinear phase shift in the first output light using the nonlinear change of refractive index caused by the input signal light;

(e) applying the first output light having the nonlinear phase shift caused and the second clock light to first delayed-interference means, thereby generating second pulsed output light from the first output light and third pulsed output light from the second clock light;
 the second output light having the second wavelength and an opposite logic to the input signal light;
 the third output light having the first wavelength;

(f) applying the second output light to second nonlinear semiconductor waveguide means to cause nonlinear change of refractive index therein;

(g) applying the third output light into the second nonlinear semiconductor waveguide means to cause nonlinear phase shift in the third output light using the nonlinear change of refractive index of the second nonlinear semiconductor waveguide means caused by the second output light;

(h) applying the third output light having the nonlinear phase shift caused to the second delayed-interference means, thereby generating fourth pulsed output light;
 the fourth output light having the first wavelength and a same logic as the input signal light; and (i) generating pulsed light for regeneration using the fourth output light.

With the method for all-optical signal regeneration according to the first aspect of the invention, the first pulsed clock light and the second pulsed clock light are generated by extracting optical clock from the input signal light, where the first clock light has the second wavelength different from the first wavelength while the second clock light has the first wavelength. The first clock light is divided into the first and second components and the first delay time is generated between them, thereby generating the first pulsed output light with the second wavelength.

The first output light with the second wavelength thus generated is applied to the first nonlinear semiconductor waveguide means to cause nonlinear phase shift in the first output light using the nonlinear change of refractive index caused by the input signal light with the first wavelength.

The first output light having the nonlinear phase shift caused and the second wavelength and the second clock light with the first wavelength are applied to the first delayed-interference means. Thus, the second pulsed output light with the second wavelength is generated from the first output light while the third pulsed output light with the first wavelength is generated from the second clock light. The second output light has an opposite logic to the input signal light.

Moreover, the second output light with the second wavelength, which is generated in the first delayed-interference means, is applied to the second nonlinear semiconductor waveguide means to thereby cause nonlinear change of refractive index therein. The third output light with the first wavelength, which is generated in the first delayed-interference means, is applied to the second nonlinear semiconductor waveguide means to thereby cause nonlinear phase shift in the third output light using the nonlinear change of refractive index caused by the second output light. The third output light having the nonlinear phase shift thus caused is applied to the second delayed-interference means, thereby generating the fourth pulsed output light having the first wavelength and the same logic as the input signal light.

The fourth output light thus generated is used to generate the pulsed light for regeneration (i.e., the regenerated light).

In this way, with the method according to the first aspect of the invention, the second pulsed output light (which has the second wavelength and the opposite logic to the pulsed input signal light with the first wavelength) is generated by using the first delayed-interference means. Then, the fourth pulsed output light (which has the first wavelength and the same logic as the input signal light) is generated from the third pulsed output light by using the second delayed-interference means. Finally, the pulsed light for regeneration (i.e., the regenerated pulse) is generated by using the fourth output light.

Accordingly, desired intensity-noise suppressing function is effectively exhibited or realized with respect to the input signal light based on the characteristics of the, first and second delayed interference means, even if the injection currents for SOAs (i.e., the first and second nonlinear semiconductor waveguide means) are not increased, and even if the magnitude of the nonlinear phase shift applied to the input signal light is less than $\pi$. Thus, the ASE noise is suppressed to thereby improve the S/N in the optical communication system.

Furthermore, the optical noise superposed on the pulsed input signal light not only at the "0" level with relatively lower intensity but also at the "1" level with relatively higher intensity are suppressed. This means that the beat noise between the input signal light and the ASE light can be suppressed.

Additionally, as clearly seen from the above description, the wavelength of the pulsed output light (i.e., the pulsed output light for regeneration) is always equalized to that of the input signal light.

In a preferred embodiment of the method according to the first aspect of the invention, input timing of the input signal light into the first nonlinear semiconductor waveguide means is set to fall between a pulse of the first component of the first output light and an adjoining pulse of the second component thereof.

In another preferred embodiment of the method according to the first aspect of the invention, in the first delayed-interference means, the first output light having the phase shift and the second wavelength is divided into the first and second components and then, the first delay time is generated between the first and second components. Thereafter, the first and second components are combined together to induce optical interference between the first and second components, thereby generating the second output light. The second clock light having the first wavelength is divided into third and fourth components and then, the first delay time is generated between the third and fourth components. Thereafter, the third and fourth components are combined together to induce optical interference between the third and fourth components, thereby generating the third output light.

In the second delayed-interference means, the third output light having the phase shift and the first wavelength is divided into fifth and sixth components and then, a second delay time is generated between the fifth and sixth components - Thereafter, the fifth and sixth components are combined together to induce optical interference between the fifth and sixth components, thereby generating the fourth output light.

In still another preferred embodiment of the method according to the first aspect of the invention, the input signal light, which has been inputted into the first nonlinear semiconductor waveguide means to cause the change of refractive index, is removed with a first wavelength filter prior to entering the first delayed-interference means.

In a further preferred embodiment of the method according to the first aspect of the invention, the second output light, which has been inputted into the second nonlinear semiconductor waveguide means to cause the change of refractive index, is removed with a second wavelength filter prior to entering tho second delay interference means.

In a still further preferred embodiment of the method according to the first aspect of the invention, a semiconductor optical amplifier (SOA) or a light-absorption type semiconductor waveguide is used as at least one of the first nonlinear semiconductor waveguide means and the second nonlinear semiconductor waveguide means.

According to a second aspect of the invention, a system for all-optical signal regeneration is provided. This system comprises:

(a) a first clock light generator for generating first pulsed clock light and a second clock light generator for generating second pulsed clock light, by extracting optical clock from input signal light with a first wavelength;
   the first clock light having a second wavelength different from the first wavelength;
   the second clock light having the first wavelength;

(b) a first output light generator for generating a first pulsed output light;
   the first output light generator dividing the first clock light into a first component and a second component and generating a first delay time between the first component and the second component, thereby generating the first output light including the first component and the second component:
   the first output light having the second wavelength;

(c) first nonlinear semiconductor waveguide means for causing nonlinear phase shift in the first output light by using nonlinear change of refractive index caused by input of the input signal light;

(d) first delayed-interference means for generating second pulsed output light from the first output light and third pulsed output light from the second clock light by receiving the first output light having the nonlinear phase shift caused and the second clock light;
   the second output light having the second wavelength and an opposite logic to the input signal light;
   the third output light having the first wavelength;

(e) second nonlinear semiconductor waveguide means for causing nonlinear phase shift in the third output light by using nonlinear change of refractive index caused by input of the second output light; and (f) second delayed-interference means for generating fourth pulsed output light by receiving the third output light having the nonlinear phase shift caused;
   the fourth output light having the first wavelength and a same logic as the input signal light;
   wherein pulsed light for regeneration is generated using the fourth output light.

With the system for all-optical signal regeneration according to the second aspect of the invention, because of the same reason as shown in the method of the first aspect, the same advantages as those in the method of the first aspect are obtained.

In a preferred embodiment of the system according to the second aspect of the invention, input timing of the input signal light into the first nonlinear semiconductor waveguide means is set to fall between a pulse of the first component of the first output light and an adjoining pulse of the second component thereof In another preferred embodiment of the system according to the second aspect of the invention, in the first delayed-interference means, the first output light having the phase shift and the second wavelength is divided into the first and second components and then, the first delay time is generated between the first and second components. Thereafter, the first and second components are combined together to induce optical interference between the first and second components, thereby generating the second output light. The second clock light having the first wavelength is divided into third and fourth components and then, the first delay time is generated between the third and fourth components. Thereafter, the third and fourth components are combined together to induce optical interference between the third and fourth components, thereby generating the third output light.

In the second delayed-interference means, the third output light having the phase shirt and the first wavelength is divided into fifth and sixth components and then, a second delay time is generated between the fifth and sixth components. Thereafter, the fifth and sixth components are combined together to induce optical interference between the fifth and sixth components thereby generating the fourth output light.

In still another preferred embodiment of the system according to the second aspect of the invention, the input signal light, which has been inputted into the first nonlinear semiconductor waveguide means to cause the change of refractive index, is removed with a first wavelength filter prior to entering the first delayed-interference means.

In a further preferred embodiment of the system according to the second aspect of the invention, the second output light, which has been applied to the second nonlinear semiconductor waveguide means to cause the change of refractive index, is removed with a second wavelength filter prior to entering the second delayed-interference means.

In a still further preferred embodiment of the system according to the second aspect of the invention, a SOA or a light-absorption type semiconductor waveguide is used as at least one of the first nonlinear semiconductor waveguide means and the second nonlinear semiconductor waveguide means.

In the system according to the second aspect of the invention, as each of the first and second nonlinear semiconductor waveguide means and first and second delayed-interference means, any device or apparatus or system may be used if it has the specific function.

According to a third aspect of the invention, another method for all-optical signal regeneration is provided. This method comprises:

(a) inputting pulsed input signal light with a first wavelength into first nonlinear semiconductor waveguide means to cause nonlinear change of refractive index therein;

(b) applying first continuous-wave light to the first nonlinear semiconductor waveguide means to thereby apply nonlinear phase shift to the first continuous-wave light using the nonlinear change of refractive index caused by the input signal;

the first continuous-wave light having a second wavelength different from the first wavelength;

(c) applying the first continuous light having the phase shift caused and the input signal light to a first delayed-interference means thereby generating distorted continuous-wave light with the second wavelength;

the distorted continuous-wave light a pulse-like continuous waveform whose logic is opposite to the input signal light;

(d) applying the distorted continuous-wave light to second nonlinear semiconductor waveguide means to thereby cause nonlinear change of refractive index therein;

(e) applying a second continuous-wave light with the first wavelength to the second nonlinear semiconductor waveguide means, thereby applying nonlinear phase shift to the second continuous-wave light using the nonlinear change of refractive index caused by the distorted continuous-wave light in the second nonlinear semiconductor waveguide means;

(f) applying the second continuous-wave light having the phase shift caused and the distorted continuous-wave light to a second delayed-interference means, thereby generating pulsed output light with the first wavelength;

the output light having a same logic as the input signal light; and (g) generating pulsed light for regeneration using the output light.

With the method for all-optical signal regeneration according to the third aspect of the invention, using the nonlinear change of refractive index caused by inputting the pulsed input signal light with the first wavelength into the first nonlinear semiconductor waveguide means, nonlinear phase shift is applied to the first continuous-wave light with the second wavelength different from the first wavelength. The pulsed input signal light and the first continuous-wave light having the phase shift applied are applied to the first nonlinear semiconductor waveguide means, thereby generating the distorted continuous-wave light with the second wavelength and the pulse-like continuous waveform whose logic is opposite to the input signal light.

The distorted continuous light thus generated is then applied to the second nonlinear semiconductor waveguide means to cause the change of refractive index therein. Using the change of refractive index thus caused, nonlinear phase shift is applied to the second continuous-wave light. The distorted continuous-wave light and the second continuous-wave light are applied to the second delayed-interference means, thereby generating the pulsed output light with the first wavelength and the same logic as the input signal light.

Finally, the pulsed light for generation is generated by using the output light.

With the method according to the third aspect of the invention, the pulsed light for generation is generated in the above-described manner. Therefore, desired intensity-noise suppressing function is effectively exhibited or realized with respect to the input signal light based on the characteristics of the first and second delayed-interference means, even if the injection currents for the SOAs (i.e., the first and second nonlinear semiconductor waveguide means) are not increased, and even if the magnitude of the nonlinear phase shift applied to the input signal light is; less than $\pi$. Thus, the AYE noise is suppressed to thereby improve the S/N in the optical communication system.

Furthermore, the optical noise superposed on the pulsed input signal light not only at the "0" level with relatively lower intensity but also at the "1" level with relatively higher intensity. This means that the beat noise between the input signal light and the ASE light can be suppressed.

Additionally, as clearly seen from the above description, the wavelength of the pulsed output light (i.e., the pulsed output light for regeneration) is always equalized to that of the input signal light.

In a preferred embodiment of the method according to the third aspect of the invention, in the first delayed-interference means, the first continuous-wave light having the phase shift caused is divided into the first and second components and then, the first delay time is generated between the first and second components. Thereafter, the first and second components are combined together to induce optical interference between them, thereby generating the distorted continuous-wave light.

In the second delayed-interference means, the second continuous-wave light having the phase shift caused is divided into third and fourth components and then, a second delay time is generated between them. Thereafter, the third and fourth components are combined together to induce optical interference between the third and fourth components, thereby generating the output light.

In another preferred embodiment of the method according to the third aspect of the invention, the input signal light, which has been inputted into the first nonlinear semiconductor waveguide means to cause the change of refractive index therein, is removed with a first wavelength filter prior to entering the first delay interference means.

In still another preferred embodiment of the method according to the third aspect of the invention, the distorted continuous-wave light, which has been applied to the second nonlinear semiconductor waveguide means to cause the change of refractive index therein, is removed with a second wavelength filter prior to entering the second delay interference means.

In a further preferred embodiment of the method according to the third aspect of the invention, a SOA or a light-absorption type semiconductor waveguide is used as at least one of the first nonlinear semiconductor waveguide means and the second nonlinear semiconductor waveguide means.

According to a fourth aspect of the invention, another system for all-optical signal regeneration is provided. This system comprises:

(a) first nonlinear semiconductor waveguide means for causing nonlinear change of refractive index therein by receiving pulsed input signal light with a first wavelength;

(b) a first continuous-wave light generator for generating a first continuous-wave light and a second continuous-wave light generator for generating a second continuous-wave light;

the first continuous-wave light having a second wavelength different from the first wavelength;

the second continuous-wave light having the first wavelength;

(c) first delayed-interference means for generating distorted continuous-wave light by receiving the first continuous-wave light having the phase shift caused by the first nonlinear semiconductor waveguide means and the input signal light;

the distorted continuous-wave light having the second wavelength and a pulse-like continuous waveform whose logic is opposite to the input signal light;

(d) second nonlinear semiconductor waveguide means for causing nonlinear change of refractive index therein by receiving the ion distorted continuous-wave light; and (e) second delayed-interference means for generating pulsed output light by receiving the distorted continuous-wave light and the second continuous-wave light having the phase shift caused by the second nonlinear semiconductor waveguide means;

the output light having the first wavelength and a pulse-like continuous waveform whose logic is a same as the input signal light;

wherein pulsed light for regeneration is generated using the output light.

With the system for all-optical signal regeneration according to the fourth aspect of the invention, because of the same reason as shown in the method of the third aspect, the same advantages as those in the method of the third aspect are obtained.

In a preferred embodiment of the system according to the fourth aspect of the invention, in the first delayed-interference means, the first continuous-wave light having the phase shift applied is divided into the first and second components and then, the first delay time is generated between the first and second components. Thereafter the first and second components are combined together to induce optical interference between the first and second components, thereby generating the distorted continuous-wave light.

In the second delayed-interference means, the second continuous-wave light having the phase shift applied is divided into third and fourth components and then, a second delay time is generated between the third and fourth components. Thereafter, the third and fourth components are combined together to induce optical interference between the third and fourth components, thereby generating the output light.

In another preferred embodiment of the system according to the fourth aspect of the invention, the input signal light, which has been inputted into the first nonlinear semiconductor waveguide means to cause the change of refractive index, is removed with a first wavelength filter prior to entering the first delay interference means.

In still another preferred embodiment of the system according to the fourth aspect of the invention, the distorted continuous-wave light, which has been applied to the second nonlinear semiconductor waveguide means to cause the change of refractive index, is removed with a second wavelength filter prior to entering the second delay interference means.

In a further preferred embodiment of the system according to the fourth aspect of the invention, a SOA or a light-absorption type semiconductor waveguide is used as at least one of the first nonlinear semiconductor waveguide means and the second nonlinear semiconductor waveguide means.

In the system according to the fourth aspect of the invention, as each of the first and second nonlinear semiconductor waveguide means and first and second delayed-interference means, any device or apparatus or system may be used if it has the specific function.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
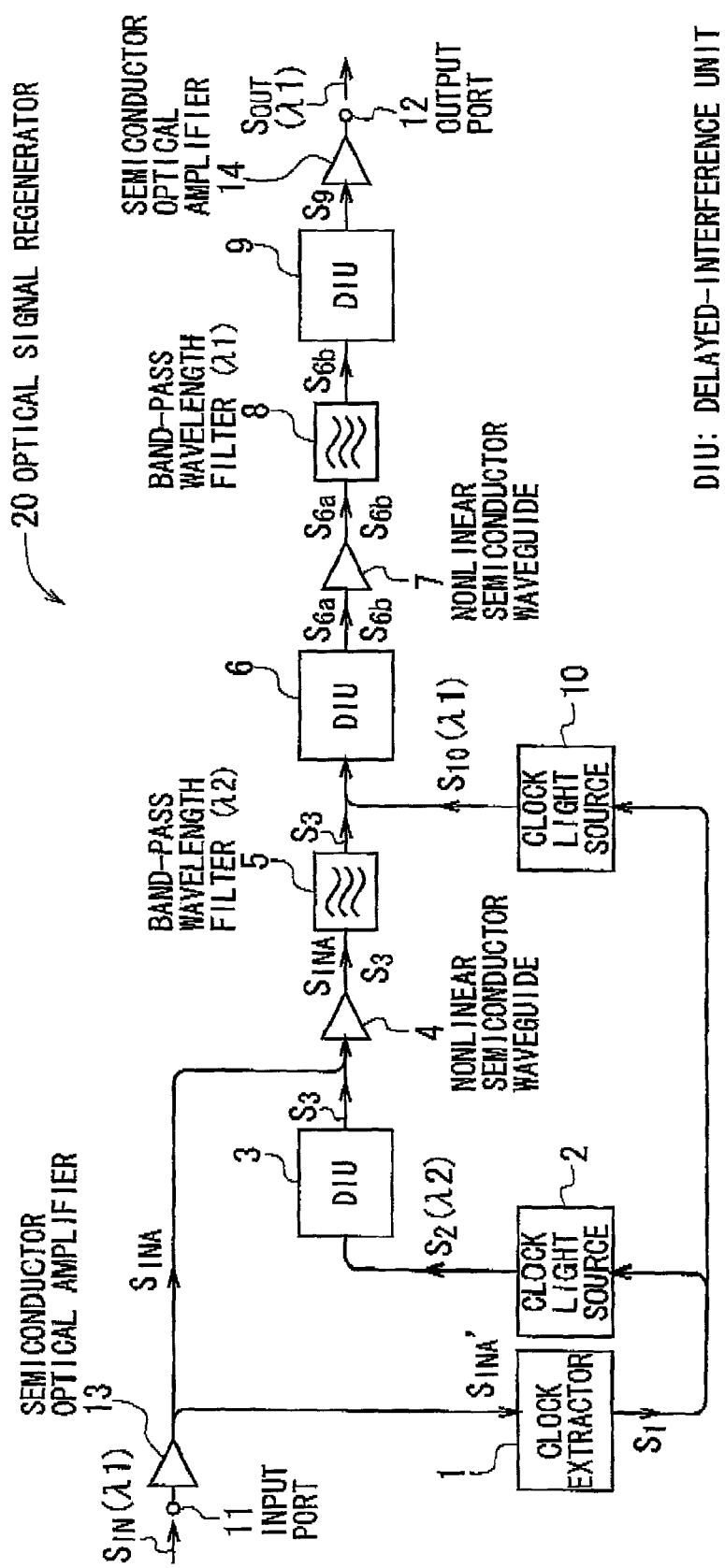
FIG. 1 is a schematic, functional block diagram showing the configuration of an all-optical signal regeneration system according to a first embodiment of the invention.

Preferred embodiments of the present invention will be described in detail below while referring to the drawings attached.

First Embodiment

An all-optical signal regeneration system 20 according to a first embodiment of the invention has the configuration as shown in FIG. 1. This system 20 conducts the optical 3R repeating process in two steps.

As shown in FIG. 1, the all-optical signal regeneration system 20 Comprises a clock extractor 1, a first clock light source 2, a first delayed-interference unit (DIU) 3, a first nonlinear semiconductor waveguide 4, a first bandpass wavelength filter 5, a second delayed-interference unit 6, a second nonlinear semiconductor waveguide 7, a second band-pass wavelength filter 8, a third delayed-interference unit 9, a second clock light source 10, an input port 11, an output port 12, a first semiconductor optical amplifier (SOA) 13, and a second semiconductor optical amplifier 14.

The first amplifier 13, the first interference unit 3, the first waveguide 4, the first filter 5, and the second interference unit 6 constitute the "first-stage optical 3R regeneration section". The second interference unit 6, the second amplifier 7, the second filter 8, the third interference unit 9, and the second amplifier 14 constitute the "second-stage optical 3R regeneration section".

Figure 3A:
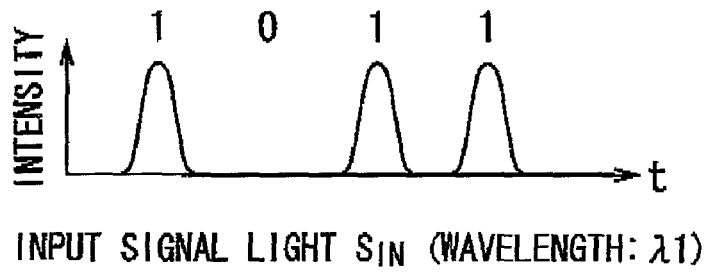
FIGS. 3A to 3D are waveform diagrams showing the waveforms of the pulsed input signal light, the second and fourth output light, and the first and second pulsed clock light used in the system according to the first embodiment of FIG. 1, respectively.

As shown in FIG. 3A, pulsed input signal light $S_{IN}$ (wavelength: $\lambda 1$), which is a Return-to-Zero (RZ) Coded signal, is inputted into the regenerator system 20 through the input port 11. First, the signal light $S_{IN}$ thus inputted is amplified by the first amplifier 13, in other words, the amplitude of the signal $S_{IN}$ is increased. As a result, pulsed, amplified signal light $S_{INA}$ is generated.

The amplified signal light $S_{INA}$ is then applied to the first waveguide 4 to thereby cause nonlinear change of refractive index in the waveguide 4 On the other hand, the light $S_{INA}$ is applied to the clock extractor 1 as well.

The clock extractor 1 extracts optical clock from the amplified signal light $S_{INA}$ and sends the clock thus extracted to the first and second clock light sources 2 and 10 as clock light or signal $S_1$.

Figure 3B:
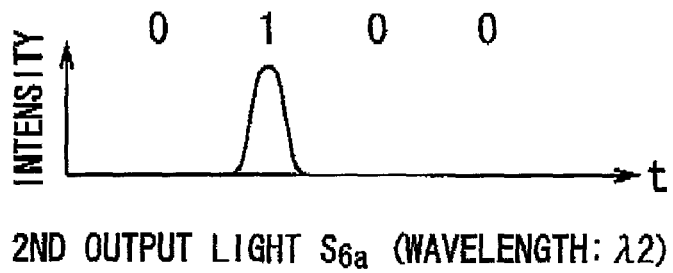
Figure 3C:
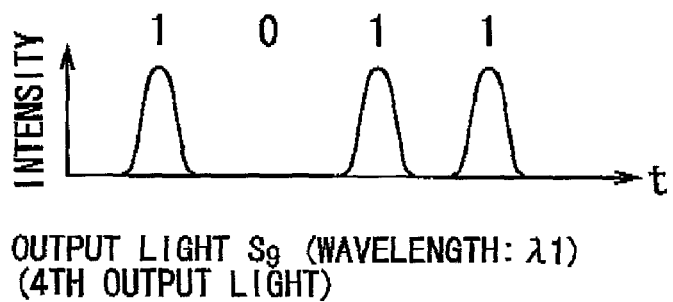
Figure 3D:
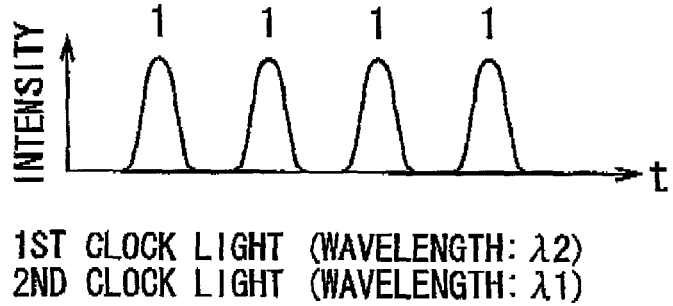

The first clock light source 2 generates a first pulsed clock light $S_2$ based on the clock signal $S_1$ thus applied. The light source 2 sends the first clock light $S_2$ to the first delayed-interference unit 3. The wavelength of the first clock light $S_2$ is $\lambda 2$, which is different from $\lambda 1$ of the input signal light $S_{IN}$. Similar to the input signal light $S_{IN}$, the first clock light $S_2$ is a RZ-Coded signal having "1" pulses and "0" pulses as shown in FIG. 3D. The repetition frequency (i.e., the bit rate) of the first clock light $S_2$ is equal to that of the input signal light $S_{IN}$.

Figure 2A:
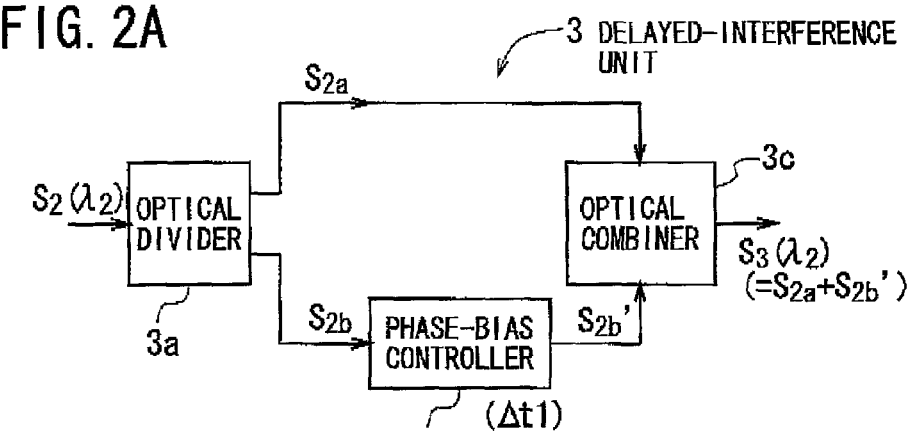
FIGS. 2A to 2C are schematic, functional block diagrams showing the configuration of the delayed-interference units used in the system of the first embodiment of FIG. 1, respectively.

The first interference unit 3 has a configuration as shown in FIG. 2A Specifically, the unit 3 comprises an optical divider 3a, a phase-bias controller 3b, and an optical combiner 3c. The first clock light $S_2$, which has been sent to the unit 3, is divided into two orthogonally polarized components $S_{2a}$ and $S_{2b}$ at an intensity ratio of 50:50 by the divider 3a. The first component $S_{2a}$ is directly sent to the combiner 3c without any change. The second component $S_{2b}$ is sent to the combiner 3c by way of the controller 3b. The controller 3b applies a delay time $\Delta t1$ to the second component $S_{2b}$, thereby forming a delayed second component $S_{2b}'$. This component $S_{2b}'$ is combined with the first component $S_{2a}$ by the combiner 3c, thereby outputting a first pulsed output light $S_3$.

The first component $S_{2a}$ and the delayed second component $S_{2b}'$, which have the time difference $\Delta t1$, are different in the state of polarization. Thus, these two components $S_{2a}$ and $S_{2b}'$ induce no optical interference in the combiner 3c. As a result, they are simply mixed together as they are, forming the first output light $S_3$. This means that the light $S_3$ contains simply the first component $S_{2a}$ and the delayed second component $S_{2b}'$.

In the all-optical signal regenerator system 20 of the first embodiment, the first clock light $S_2$ contains the first component $S_{2a}$ and the delayed second component $S_{2b}$ that are polarized orthogonally. However, it is sufficient that these two components $S_{2a}$ and $S_{2b}$ are orthogonal in the state of polarization. For example, the first component $S_{2a}$ may be a right-handed circular-polarized component while the second component $S_{2b}$ may be a left-handed circular-polarized component.

It is optimum that the valued of the delay time $\Delta t1$ given to the second component $S2b$ in the first interference unit 3 is equal to 50% of the pulse interval of the input signal light $S_{IN}$ (which is equal to the pulse width of the clock light S2). However, the magnitude of the time $\Delta t1$ may be changed within the range from approximately 25% to approximately 75% of the pulse interval of the signal light $S_{IN}$. This is due to the following reason.

Specifically, as explained later, when a delay time $\Delta t2$ is applied to the first pulsed interference light $S_3$ having phase shift in the second interference unit 6, the magnitude of the time $\Delta t2$ is adjusted or controlled in such a way that constructive or destructive interference occurs between the first and second polarized components $S_{2a}$ and $S_{2b}$ of the first output light $S_3$. At this time, desired optical interference can be realized more easily, if the magnitude of the time $\Delta t1$ is set within the above-identified range of approximately 25% to approximately 75% of the pulse interval of the input light $S_{IN}$.

As explained above, the first polarized component $S_{2a}$ and the delayed second polarized component $S_{2b}'$ will cause no optical interference. Therefore, any other optical element or device may be used for this purpose instead of the first delayed-interference unit 3, if it has a function of dividing the first clock light $S_2$ into two orthogonally polarized components, giving the delay time $\Delta t1$ between these two components, and combining them together again.

The first output light $S_3$ (=$S_{2a}$+$S_{2b}'$) with the wavelength $\lambda 2$, which is generated by the first interference unit 3, is then applied to the first nonlinear semiconductor waveguide 4. If the amplified signal light $S_{INA}$ is applied to the waveguide 4, nonlinear change of refractive index is induced in the waveguide 4. Thus, the phase of the light $S_3$ thus applied is shifted according to the change of refractive index thus induced in the waveguide 4 and therefore, the phase-shifted light S3 is emitted from the waveguide 4. At the same time as this, the amplified signal light $S_{INA}$ is emitted from the waveguide 4 as well, where no phase shift occurs in the light $S_{INA}$. Accordingly, the first output light $S_3$ containing the phase shift and the input signal light $S_{INA}$ containing no phase shift are emitted from the waveguide 4.

The first output light $S_3$ and the amplified input signal light $S_{INA}$, which are emitted from the waveguide 4, are then applied to the first band-pass wavelength filter 5 The filter 5 has a characteristic that allows the light $S_3$ with the wavelength $\lambda 2$ to pass through it and that blocks the light $S_{INA}$ with the wavelength $\lambda 1$. Therefore, the light $S_{INA}$ is eliminated by the filter 5. The light $S_3$ ($=S_{2a}+S_{2b}'$) is sent to the second delayed-interference unit 6.

On the other hand, the second clock light source 10 generates a second pulsed clock light $S_{10}$ (wavelength: $\lambda 1$) as shown in FIG. 3D, based on the clock light $S_1$ sent from the clock extractor 1. The second clocklight $S_{10}$ thus generated is applied to the second interference unit 6. The wavelength of the light S10 is $\lambda 1$, which is equal to the input signal light $S_{IN}$ and different from the wavelength $\lambda 2$ of the first clock light $S_2$. The waveform of the second clock light $S_{10}$ is the same as the first clock light $S_2$.

Figure 4:
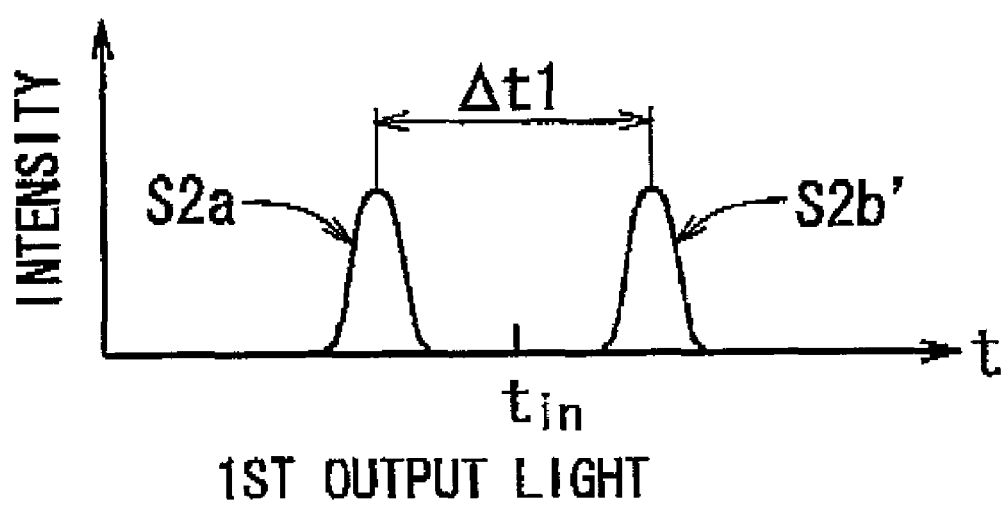
FIG. 4 is a waveform diagram showing the relationship between the two component pulses of the pulsed first output light and the input or application timing of the pulsed first clock light in the system according to the first embodiment of FIG. 1.

Thus, the first output light $S_3$ ($=S_{2a}+S_{2b}'$) with the wavelength $\lambda 2$ and the second clock light S10 with the wavelength $\lambda 1$ are applied to the second interference unit 6. At this time, the timing on which the second clock light $S_{10}$ is applied to the unit 6 is set as shown in FIG. 4. In other words, this timing is set at a time $t_{in}$ between a pulse of the first polarized component $S_{2a}$ and its adjoining pulse of the delayed second polarized component $S_{2a}'$ between which the delay time $\Delta t1$ is applied. Thus, the peak of the pulse of the second clock light $S_{10}$ is determined at the time $t_{in}$.

Figure 2B:
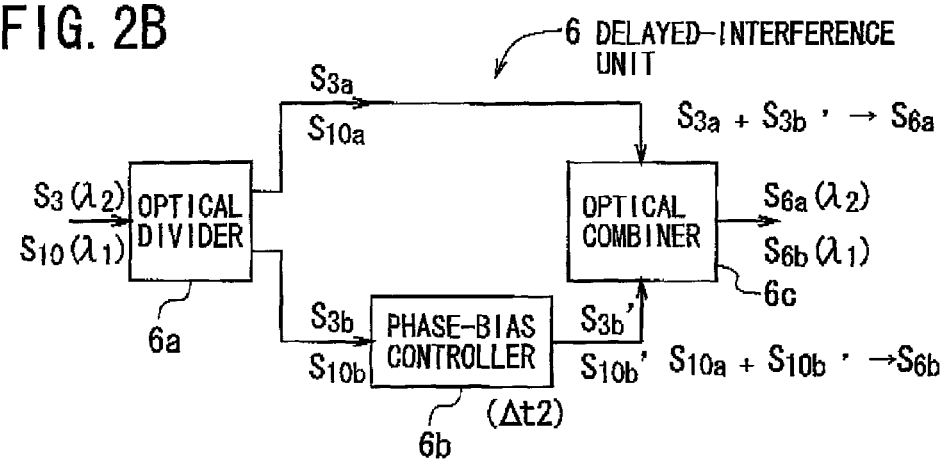

The second interference unit 6 has the same configuration as the first interference unit 3. Specifically, as shown in FIG. 2B, the unit 6 comprises an optical divider 6a, a phase-bias controller 6b, and an optical combiner 6c. The first output light $S_3$, which has been sent to the unit 6, is divided into first and second components $S_{3a}$ and $S_{3b}$ at an intensity ratio of 50:50 by the divider 6a. The first component $S_{3a}$ is directly sent to the combiner 6c without any change. The second component $S_{3b}$ is sent to the combiner 6c by way of the controller 6b. The controller 6b applies a delay time $\Delta t2$ to the second component $S_{2b}$, thereby forming a delayed second component $S^{2b'}$. This component $S_{2b}'$ is combined with the first component $S_{2a}$ by the combiner 6c, thereby causing optical interference. As a result, interfered light from the first and second components $S_{3a}$ and $S_{3b}$ is emitted from the combiner 6c as second pulsed output light $S_{6a}$ with the wavelength $\lambda 2$.

Similarly, in the second interference unit 6, the second clock light $S_{10}$ with the wavelength $\lambda 1$, which has been sent to the unit 6 from the second clock light source 10, is divided into first and second components $S_{10a}$ and $S_{10b}$ at an intensity ratio of 50:50 by the, divider 6a. The first component $S_{10a}$ is directly sent to the combiner 6c without any change. The second component $S_{10b}$ is sent to the combiner 6c by way of the controller 6b. The controller 6b applies a delay time $\Delta t2$ to the second component $S_{10b}$, thereby forming a delayed second component $S_{10b}'$. This component $S_{10b}'$ is combined with the first component $S_{10a}$ by the combiner 6c; however, no optical interference will occur between these two components $S_{10a}$ and $S_{10b}'$. As a result, third pulsed output light $S_{6b}$ with the wavelength $\lambda 1$, which contains the components $S_{10a}$ and $S_{10b}'$ is emitted from the combiner 6c.

Whether the first component $S_{3a}$ and the delayed second component $S_{3b}'$ will cause constructive or destructive interference in the combiner 6c of the second interference unit 6 is determined by the following two factors (i) and (ii).

(i) Whether the amplified signal light $S_{INA}$ that passes through the first semiconductor optical waveguide 4 approximately simultaneously with the first output light $S_3$ (wavelength: $\lambda 2$) is at the "1" pulse or "0" pulse (i.e., in the high or low level).

(ii) How the interference phase-bias to be applied in the controller 6b is set, in other words, how the delay time $\Delta t2$ applied to the second component $S_{3b}$ of the first output light $S_3$ in the controller 6b is set.

In the combiner 6c, the first component $S_{10a}$ and the delayed second component $S_{10b}$ are not interfered with each other.

With the all-optical signal regenerator 20 of the first embodiment of FIG. 1, the sum or difference between the delay time $\Delta t2$ applied by the controller 6b of the second interference unit 6 and the delay time $\Delta t1$ applied by the controller 3b of the first interference unit 3 is properly adjusted in such a way that destructive interference occurs and the two component $S_{10a}$ and $S_{10b}$ disappear when the signal light $S_{IN}$ is at its "1" pulse (i.e., at its high level). Thus, the second output light $S_{6a}$ (wavelength: $\lambda 2$), which is emitted from the second interference unit 6, has a "0" pulse when the signal light $S_{IN}$ is at its "1" pulse (high level) and a "1" pulse when the signal light $S_{IN}$ is at its "0" pulse (low level). In other words, the second output light $S_{6a}$ has an opposite logic to the first output pulse $S_3$, as shown in FIG. 3B.

In contrast, the first component or divided light $S_{10a}$ and the second component or divided light $S_{10b}$ of the second clock light $S_{10}$ are not interfered with each other. Thus, the third output light $S_{6b}$ is pulsed light that contains the two divided light or components $S_{10a}$ and $S_{10b}'$.

The second interference unit 6 has a sinusoidal transfer function and therefore, intensity noise contained in the second output light $S_{6a}$ is removed due to the following reason.

Generally, the output of an interference unit has a sinusoidal response to a phase shift. Specifically, supposing that $\Delta\Phi$ is the magnitude of a nonlinear phase shift, the output of an interference unit is given to be proportional to $\sin^2(\Delta\Phi/2)$.

For example, if it is supposed that the "1" pulse has a phase shift of $0.5\pi$ and the "0" pulse has no phase shift, it can be said as follows.

Since optical noise superposed on the "1" pulse applies noise to phase shift, the phase shift has dispersion in the vicinity of $0.5\pi$, which induces comparatively large noise in the output of the interference unit. On the other hand, optical noise superposed on the "0" pulse applies noise to phase shift, and the phase shift has dispersion in the vicinity of 0, which induces noise in the output of the interference unit as well.

However, as described above, the output characteristic of the interference unit is proportional to $\sin^2(\Delta\Phi/2)$. Thus, the outputted noise induced by the phase shift noise in the vicinity of 0 is much smaller than that in the vicinity of $0.5\pi$.

If this is applied to the second interference unit 6, it is seen that the intensity noise superposed on the "0" pulse of the second output light $S_{6a}$ emitted from the unit 6 is much smaller than that superposed on the "1" it pulse thereof.

This is disclosed by the previously-referred papers, Electronics Letters, Vol. 32, No 6, pp. 566–567, March 1996 and IEEE Photonics Technology Letters, Vol. 10, No. 10, pp. 1413–1415.

At the same time, almost all the non-uniformity of intensity superposed on the "1" pulse of the input signal light $S_{IN}$ is suppressed.

The noise suppressing function and the intensity non-uniformity suppressing function given by the second interference unit 6 are effective even if the nonlinear phase shift applied to the first output light $S_3$ in the first semiconductor waveguide 4 is as small as approximately 0.2 π.

The above-described processes are included in the first-stage optical 3R regeneration operation. Therefore, the second-stage optical 3R regeneration operation is carried out in the following way.

In the second-stage optical 3R regeneration operation, the second output light $S_{6a}$ (wavelength. λ2) emitted from the second interference unit 6 is used to cause nonlinear change of refractive index in the second nonlinear semiconductor waveguide 7.

First, the second output light $S_{6a}$ (wavelength: λ2) and the third output light $S_{6b}$ (wavelength: λ1) are applied to the second nonlinear semiconductor optical waveguide 7. The second output light $S_{6a}$ causes nonlinear change of refractive index in the waveguide 7. The second output light $S_{6a}$, which is an RZ-coded signal, has a waveform as shown in FIG. 3B. The waveform of FIG. 3B is opposite in logic to the signal light $S_{IN}$ (wavelength: λ1) Therefore, nonlinear change of refractive index is generated in the waveguide 7 according to the opposite logic to the signal light $S_{IN}$. As a result, the change of refractive index will cause phase shift in the third output light $S_{6b}$ and then, the light $S_{6b}$ thus phase-shifted is outputted from the waveguide 7.

The second output light $S_{6a}$, which has been used to cause the nonlinear change of refractive index in the second waveguide 7, is emitted from the waveguide 7 without any phase shift.

Thus, the phase-shifted third output light $S_{6b}$ and non-phase-shifted second output light $S_{6a}$ are outputted from the second waveguide 7. These two light 6a and 6a are sent to the second band-pass wavelength filter 8. The filter 8 has a characteristic that allows the third output light $S_{6b}$ with the wavelength λ1 to pass through it and that blocks the second output light $S_{6a}$ with the wavelength λ2. Therefore, the second output light $S_{6a}$ is eliminated by the filter 8, and only the third output light $S_{6b}$ is sent to the third interference unit 9.

Figure 2C:
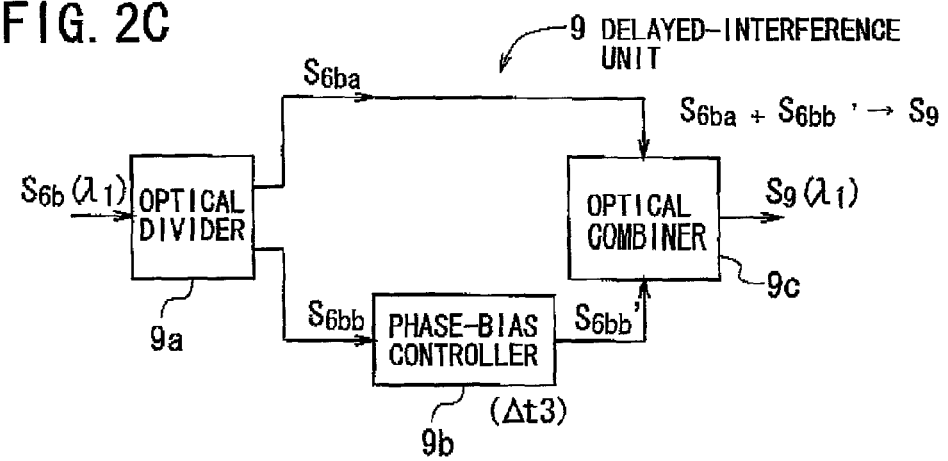

The third interference unit 9 has the same configuration as the first interference unit 3 too. Specifically, as shown in FIG. 2C, the unit 9 comprises an optical divider 9a, a phase-bias controller 9b, and an optical combiner 9c. The third output light $S_{6b}$, which has been sent to the unit 9, is divided into first and second components $S_{6ba}$ and $S_{6bb}$ at an intensity ratio of 50:50 by the divider 9a. The first component $S_{6ba}$ is directly sent to the combiner 9c without any change. The second component $S_{6bb}$ is sent to the combiner 9c by way of the controller 9b. The controller 9b applies a delay time Δt3 to the second component $S_{6bb}$, thereby forming a delayed second component $S_{6bb}'$. This component $S_{6bb}'$ is coupled with the first component $S_{6ba}$ by the combiner 9c, thereby causing optical interference. As a result, interfered light from the first and second components $S_{6ba}$ and $S_{6bb}$ is emitted from the combiner 9c as fourth pulsed output light $S_9$ with the wavelength λ1.

In the all-optical signal regenerator 20 of the first embodiment, the sum or difference among the delay time Δt3 applied by the controller 9b of the third interference unit 9, the delay time Δt2 applied by the controller 6b of the second interference unit 6, and the delay time Δt1 applied by the controller 3b of the first interference unit 3 is properly adjusted in such a way that destructive interference occurs between the components $S_{6ba}$ and $S^{6bb'}$ and these two component $S_{6ba}$ and $S_{6bb}$ disappear when the second output light $S_{6a}$ is at its "1" pulse (i.e., at its high level). Thus, the fourth output light $S_9$ (wavelength: λ1) is emitted from the third interference unit 9 only when the second output light $S_{6a}$ is at its "0" pulse (low level). In other words, the fourth output light $S_9$ is in the same logic state as the input signal light $S_{IN}$, as shown in FIG. 3C.

In the third interference unit 9 too, because of the sinusoidal transfer function, the intensity noise superposed on the "1" pulse of the fourth output light $S_9$ emitted from the unit 9 is much smaller than that superposed on the "0" pulse thereof. At the same time, almost all the non-uniformity of intensity superposed on the "1" pulse of the input signal light $S_{IN}$ is suppressed.

The noise suppressing function and the intensity non-uniformity suppressing function given by the third interference unit 9 are effective even if the nonlinear phase shift applied to the third output light $S_{6b}$ in the second semiconductor waveguide 7 is as small as approximately 0.2 π.

Thus, the second-stage optical 3R regeneration operation is completed.

The fourth pulsed output light $S_9$ (wavelength: λ1) thus generated is amplified by the second semiconductor optical amplifier 14 and then, outputted through the output port 12 as pulsed output signal light (i.e., pulsed light for regeneration) $S_{OUT}$.

Accordingly, the waveform of the pulsed output signal light $S_{OUT}$ has the same logic as that of the input signal light $S_{IN}$ applied through the input port 11. The intensity noise and the non-uniformity of intensity superposed on the "1" pulse of the input signal light $S_{IN}$ are suppressed by the second interference unit 6. The intensity noise and the non-uniformity of intensity superposed on the "0" pulse of the input signal light $S_{IN}$ are suppressed by the third interference unit 9. Hence, the intensity noise and the non-uniformity of intensity superposed on the "1" and "0" pulses of the input signal light $S_{IN}$ are effectively suppressed or eliminated.

As explained above, with the all-optical signal regenerator 20 of the first embodiment, desired intensity-noise suppressing function and desired intensity non-uniformity suppressing function are effectively exhibited or realized, even if the injection currents for the first and second nonlinear semiconductor waveguides 4 and 7 are not increased, and even if the magnitude of the nonlinear phase shift applied to the input signal light $S_{IN}$ is less than π. Thus, the ASE noise is suppressed to thereby improve the S/N in the optical communication system.

Furthermore, the second output light $S_{6a}$ whose waveform is opposite in logic state to the input signal light $S_{IN}$ is generated by the second interference unit 6 and then, the fourth output light $S_9$ whose waveform is the same in logic state as the input signal light $S_{IN}$ is generated by the third interference unit 9. The fourth output light $S_9$ thus generated is amplified and then, outputted as the pulsed output light $S_{OUT}$. As a result, the optical noise superposed on the pulsed input signal light $S_{IN}$ not only at the "0" level with relatively lower intensity but also at the "1" level with relatively higher intensity are suppressed. Thus, the beat noise between the input signal light $S_{IN}$ and the ASE light can be suppressed.

Additionally, as clearly seen from the above description, the wavelength λ1 of the output light (i.e., the output light for regeneration) $S_{OUT}$ is always equalized to that of the input signal light $S_{IN}$.

Figure 8A:
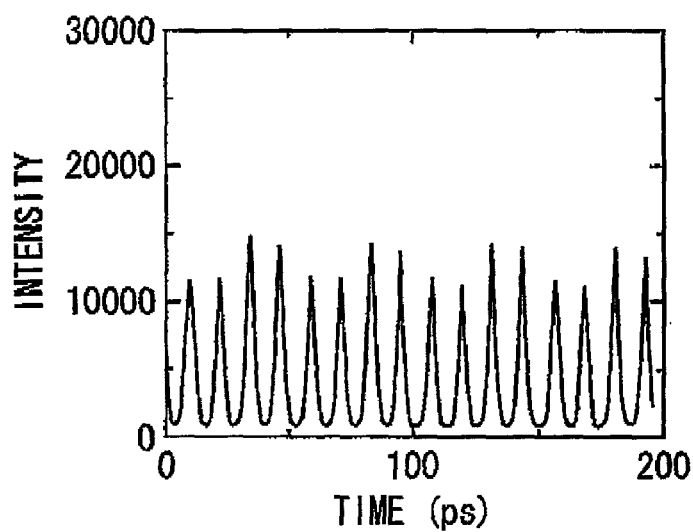
FIGS. 8A, 8B and 8C are graphs showing the result of the test, which was obtained by the inventor's test for examining the intensity inconsistency superposed on the pulsed input signal light in the system of the first embodiment of FIG. 1, respectively.
Figure 8B:
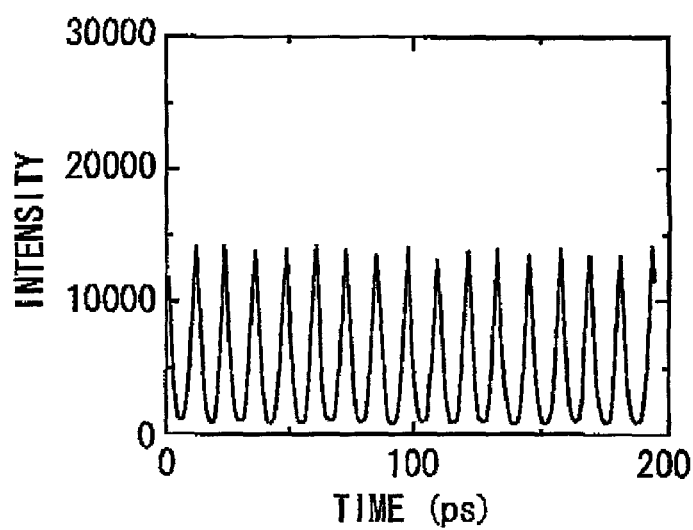
Figure 8C:
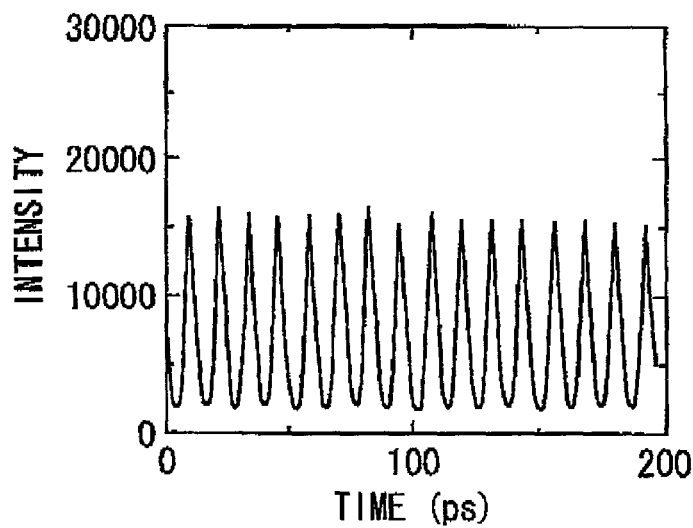

FIGS. 8A, 8B, and 8C show the waveform diagrams, which were obtained by the inventor's test for examining the intensity inconsistency superposed on the pulsed input signal light $S_{IN}$ in the system of the first embodiment of FIG. 1.

In this test, a 84 Gbit/s pseudo random signal light (word length=$2^{31}$−1, mark rate=½) was supplied to the input port 11 as the input signal light $S_{IN}$. At the same time as this, a 84 Gbit/s clock light was supplied to the first delay interference unit 3 as the first clock light $S_2$. Then, the output signal, i.e., the second output light $S_{6a}$, was measured.

FIG. 8A shows the waveform of the pseudo random signal light as the input signal light $S_{IN}$, FIG. 8B shows the waveform of the first clock light $S_2$, and FIG. 8C shows the waveform of the second output light $S_{6a}$ (i.e., the output light of the second interference unit 6). These waveforms were average waveforms measured with a streak camera that was sub-harmonic synchronized with the repetition frequency of 82 MHz (=84 GHz/1024). The streak camera outputted averaged waveforms in groups of 1024 bits. Since the word length did not divide by 1024, the input and output waveforms measured by the camera seemed to have "1" only, i.e., "1111111111", as shown in FIGS. 8A and 8B. The actual input signal light $S_{IN}$ was the pseudo random signal light (e.g., "1101001101 . . . "). The actual output signal light $S_{6a}$ was the pseudo random signal light ("0010110010 . . . ")

In this test, he signal light of FIG. 8A whose intensity is non-uniform was intentionally generated and then, applied to the input port 11. Then, the phase-bias controllers 3b, 6b, and 9b of the first, second, and third delayed-interference units 3, 6, and 9 were properly controlled or adjusted. The output light of the unit 6 was sent to an error-rate measuring apparatus by way of a 84 Gbit/s all-optical demultiplexer and a 10 Gbit/s optical receiver. Thus, it was confirmed that the first-stage "optical 3R section" of the system 20 of the first embodiment operated normally in negative logic without any errors. At this time, the nonlinear phase shift was 0.2 π.

Thereafter, the output light of the second interference unit 6 was measured. The result of this measurement is shown in FIG. 8C.

As seen from the graphs of FIGS. 8A, 8B, and 8C, the intensity non-uniformity of the light is effectively suppressed as well.

In addition, with the system 20 of the first embodiment, semiconductor optical amplifiers (SOAs) or light-absorption type semiconductor waveguides may be used as the first and second nonlinear semiconductor waveguides 4 and 7. If semiconductor optical amplifiers are used, there is an additional advantage that the system 20 is applicable even if the level of the input signal light $S_{IN}$ (i.e., the input power) is low On the other hand, if light-absorption type semiconductor waveguides are used, there is an additional advantage that the system 20 is applicable even if the repetition frequency of the input signal light $S_{IN}$ is high, because these waveguides have high response speed.

If semiconductor optical amplifiers are used as the nonlinear semiconductor waveguides 4 and 7, the amplifiers 13 and 14 may be canceled; This is because semiconductor optical amplifiers themselves have their amplification functions.

Instead of the semiconductor optical amplifiers, optical fiber amplifiers may be used for this purpose.

In the regenerator system 20 of the first embodiment, the first, second, and third delay interference units 3, 6, and 9 correspond to the "first output light generating means", the "first delayed-interference means", and the "second delayed-interference means", respectively.

Second Embodiment

Figure 5:
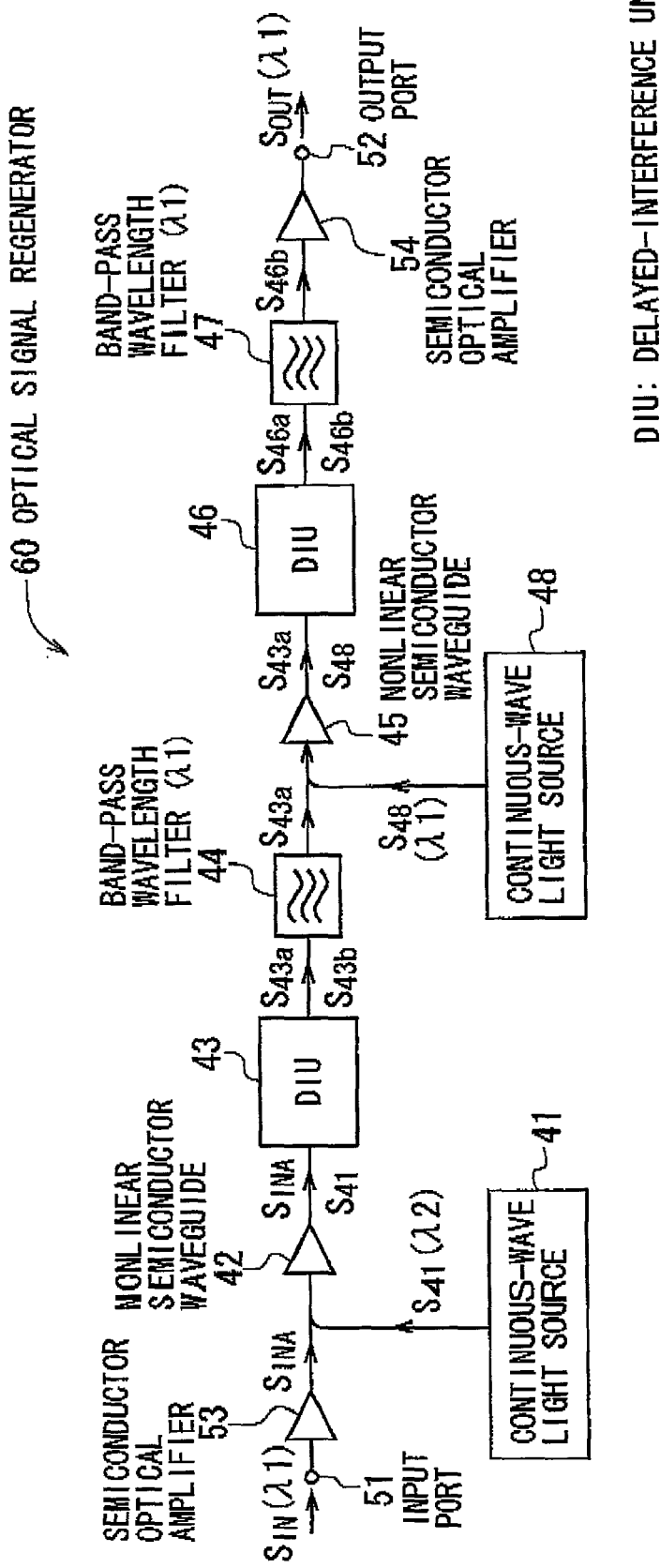
FIG. 5 is a schematic, functional block diagram showing the configuration of an all-optical signal regeneration system according to a second embodiment of the invention.

FIG. 5 shows an all-optical signal regeneration system 60 according to a second embodiment of the invention. This system 60 provides the "optical 2R generation operation", which is unlike the system 20 of the first embodiment.

As shown in FIG. 5, the all-optical signal regeneration system 60 comprises a first continuous-wave (CW) light source 41, a first nonlinear semiconductor waveguide 42, a first delayed-interference unit 43, a first band-pass wavelength filter 44, a second nonlinear semiconductor waveguide 45, a second delayed-interference unit 46, a second band-pass wavelength filter 47, a second CW light source 48, an input port 51, an output port 52, a first semiconductor optical amplifier (SOA) 53, and a second semiconductor optical amplifier 54.

The first amplifier 53, the first CW light source 41, the first waveguide 42, the first interference unit 43, and the first filter 44 constitute the "first-stage optical 2R regeneration section". The second amplifier 54, the second CW light source 48, the second waveguide 45, the second interference unit 46, and the second filter 47 constitute the "second-stage optical 2R regeneration section".

Figure 7A:
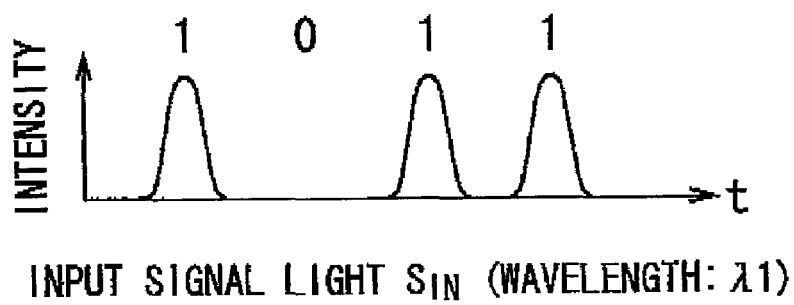
FIGS. 7A to 7C are waveform diagrams showing the waveforms of the pulsed input signal light, the distorted continuous-wave light, and the output light according to the second embodiment of FIG. 5, respectively.

As shown in FIG. 7A, the pulsed input signal light $S_{IN}$ (wavelength: λ1) is formed by the sequence of "1" pulses and "0" pulses (i.e., spaces), which is a RZ-Coded signal like the first embodiment. The input signal light $S_{IN}$ is inputted into the regenerator system 60 through the input port 51. First, the signal light $S_{IN}$ thus inputted is amplified by the first amplifier 53, in other words, the amplitude of the signal $S_{IN}$ is increased. As a result, pulsed, amplified signal light $S_{INA}$ is generated.

The amplified signal light $S_{INA}$ is applied to the first waveguide 42 to thereby cause nonlinear change of refractive index in the waveguide 42. The light $S_{INA}$ emitted from the waveguide 42 is sent to the first interference unit 43.

On the other hand, the first CW light source 41 generates first continuous-wave light $S_{41}$ with the wavelength λ2 different from the wavelength λ1 of the input signal $S_{IN}$. The light $S_{41}$ is applied to the first waveguide 42. The first CW light $S_{41}$, which has a constant intensity, is subject to nonlinear phase shift. This nonlinear phase shift is caused by nonlinear change of refractive index induced in the first waveguide 42 by the amplified input signal light $S_{INA}$. The first continuous light $S_{41}$ thus phase-shifted is sent to the first interference unit 43. At this time, no phase shift will occur in the light $S_{INA}$ emitted from the first waveguide 42.

Figure 6A:
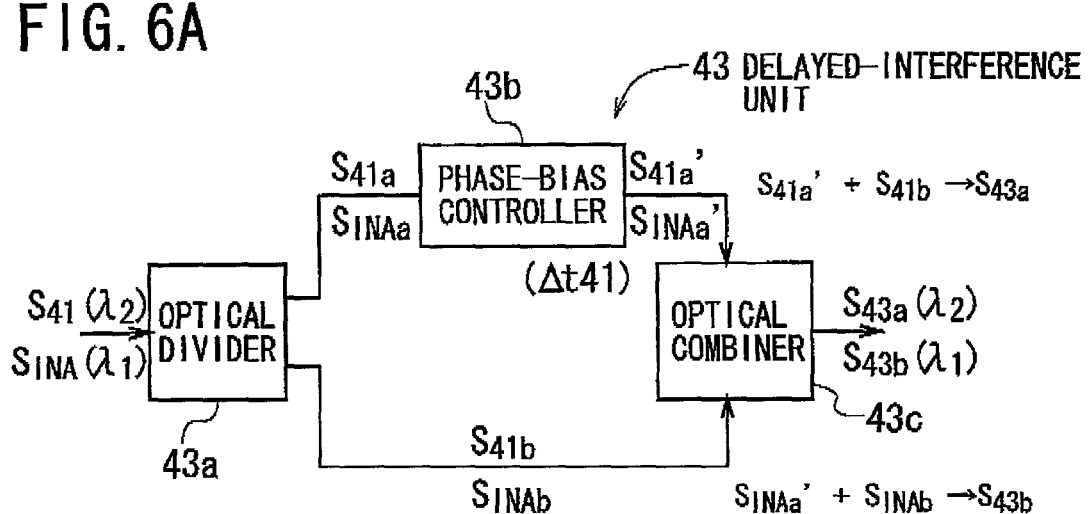
FIGS. 6A and 6B are schematic, functional block diagrams showing the configuration of the delayed-interference units used in the system of the second embodiment of FIG. 5, respectively.

The first interference unit 43 has a configuration shown in FIG. 6A. Specifically, the unit 43 comprises an optical divider 43a, a phase-bias controller 43b, and an optical combiner 43c. The phase-shifted first CW light $S_{41}$, which has been sent to the unit 43, is divided into first and second polarized components $S_{41a}$ and $S_{41b}$ by the divider 43a. These two components $S_{41a}$ and $S_{41b}$ have the same state of polarization. The second component $S_{41a}$ is directly sent to the combiner 43c without any change. The first component $S_{41a}$ is sent to the combiner 43c by way of the controller 43b. The controller 43b applies a delay time Δt41 to the first component $S_{41a}$, thereby forming a delayed first component $S_{41a}'$. This component $S_{41a}'$ is coupled with the second component $S_{41b}$ by the combiner 43c. Since the first and second components $S_{41a}'$ and $S_{41b}$ are the same in the state of polarization, they interfere optically with each other in the combiner 43c. Thus, the interfered light of the components $S_{41a}'$ and $S_{41b}$ is outputted as first output light $S_{43a}$ with the wavelength $\lambda 2$.

Similarly, the amplified input signal light $S_{INA}$, which has been sent to the unit 43, is divided into first and second polarized components $S_{INAa}$ and $S_{INAb}$ by the divider 43a. These two components $S_{INAa}$ and $S_{INAb}$ have the same state of polarization. The second component $S_{INAa}$ is directly sent to the combiner 43c without any change. The first component $S_{INAa}$ is sent to the combiner 43c by way of the controller 43b. The controller 43b applies the same delay time $\Delta t41$ to the first component $S_{INAa}$, thereby forming a delayed first component $S_{INA}'$. This component $S_{INAa}'$ is coupled with the second component $S_{INAb}$ by the combiner 43c. Although the first and second components $S_{INAa}'$ and $S_{INAb}$ are the same instate of polarization, they do not optically interfere with each other in the combiner 43c. Thus, a second output light $S_{43b}$ with the wavelength $\lambda 1$, which includes the first and second components $S_{INAa}'$ and $S_{INAb}$, is outputted from the unit 43.

Figure 7B:
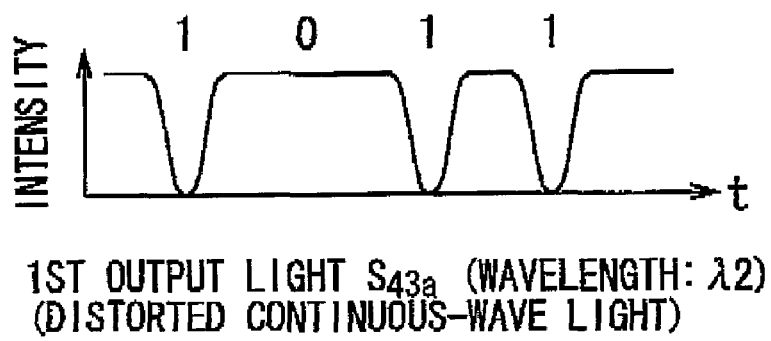

In the all-optical signal regenerator system 60 of the second embodiment, destructive interference occurs between the components $S_{41a}'$ and $S_{41b}$ and these two components $S_{41a}'$ and $S_{41b}$ disappear in the combiner 43c, when the input signal light $S_{IN}$ is at its "1" pulse (i.e., at its high level). Thus, when the input signal light $S_{IN}$ is at its "1" pulse (high level), depressions with a width of $\Delta t41$ are formed in the waveform of the first CW light $S_{41}$ (wavelength: $\lambda 1$). In other words, the light $S_{41}$ has a pulse-like continuous waveform whose depressions have a width of $\Delta t41$ are formed. As a result, the first output light $S_{43a}$ (wavelength: $\lambda 2$), which is emitted from the first interference unit 43, has a particular waveform, as shown in FIG. 7B. The average intensity of the light $S_{43a}$ is greater than half of the peak intensity. Here, this light $S_{43a}$ is termed the "distorted continuous-wave (CW) light".

The delay time $\Delta t41$ given by the first interference unit 43 is set to be equal to or less than 50% of the pulse interval of the input signal light $S_{IN}$ and to be approximately equal to the pulse width of the same light $S_{IN}$. This is to generate the "distorted CW light" shown in FIG. 7B whose signal level is varied according to the "1" level and the "0" level of the input light $S_{IN}$ of FIG. 7A.

In the first interference unit 43, because of the sinusoidal transfer function, almost of the intensity noise superposed on the "1" pulse of the input signal light $S_{IN}$ is removed. In other words, the intensity noise superposed on the "0" pulse of the first output light $S_{43a}$ is less than the intensity noise superposed on the "1" pulse thereof.

At the same time, almost all the non-uniformity of intensity superposed on the "1" pulse of the input signal light $S_{IN}$ suppressed.

The noise-suppressing function and the intensity non-uniformity suppressing function given by the first interference unit 43 are effective even if the nonlinear phase shift applied to the first output light $S_{43}$ in the first semiconductor waveguide 42 is as small as approximately 0.2 $\pi$.

The first output light $S_{43a}$ and the second output light $S_{43b}$ are sent to the first band-pass wavelength filter 44. Since the filter 44 blocks the second output light $S_{43b}$ (wavelength: $\lambda 1$), only the first output light $S_{43a}$ (wavelength: $\lambda 2$) having the waveform shown in FIG. 7B passes through the filter 44 to the second waveguide 45.

The above-described processes are included in the first-stage optical 2R regeneration operation. Thereafter, the second-stage optical 2R regeneration operation is carried out in the following way.

The first output light $S_{43}a$ (wavelength: $\lambda 2$), which has passed through the first band-pass filter 44, is applied to the second waveguide 45 to thereby cause nonlinear change of refractive index in the waveguide 45.

On the other hand, the second CW light source 48 generates second CW light $S_{48}$ with the wavelength $\lambda 1$, which is the same as the input signal $S_{IN}$. The light $S_{48}$ is then applied to the second waveguide 45. The second CW light $S_{48}$, which has a constant intensity, is subject to nonlinear phase shift caused by the nonlinear change of refractive index induced in the second waveguide 45 by the first output light $S_{48}$. The first CW light $S_{48}$ thus phase-shifted is sent to the second interference unit 46.

Figure 6B:
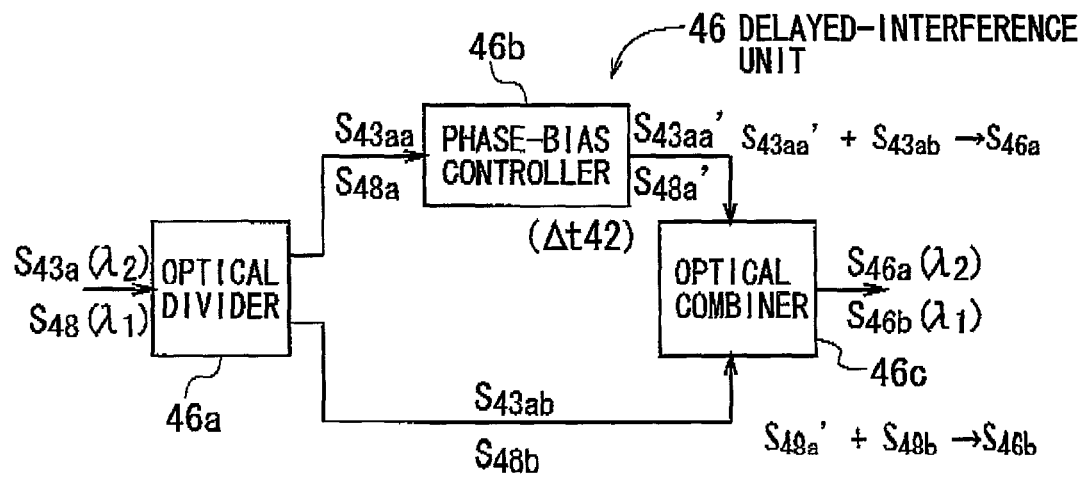

The second interference unit 46 has a configuration shown in FIG. 6B. Specifically, the unit 46 comprises an optical divider 46a, a phase-bias controller 46b, and an optical combiner 46c. The first output light $S_{43a}$, which has been sent to the unit 46, is divided into first and second polarized components $S_{43aa}$ and $S_{43ab}$ by the divider 46a. The second component $S_{43ab}$ is directly sent to the combiner 46c without any change. The first component $S_{43ab}$ is sent to the combiner 46c by way of the controller 46b. The controller 46b applies a delay time $\Delta t42$ to the first component $S_{43aa}$, thereby forming a delayed first component $S_{43aa}'$. This component $S_{43aa}'$ is combined with the second component $S_{43ab}$ by the combiner 46c. The first and second components $S_{43aa}'$ and $S_{43ab}$ do not interfere optically with each other in the combiner 46c. Thus, third output light $S_{46}$ (wavelength: $\lambda 2$) containing the components $S_{43aa}'$ and $S_{43ab}$ is outputted.

On the other hand, the second output light $S_{48}$, which has been sent to the unit 46, is divided into first and second polarized components $S_{48a}$ and $S_{48b}$ by the divider 46a. The second component $S_{48b}$ is directly sent to the combiner 46c without any change. The first component $S_{48a}$ is sent to the combiner 46c by way of the controller 46b. The controller 46b applies the same delaytime $\Delta t42$ to the first component $S_{48a}$, thereby forming a delayed first component $S_{48a}'$. This component $S_{48a}'$ is combined with the second component $S_{48a}$ by the combiner 46c. The first and second components $S_{48a}'$ and $S_{48b}$ will interfere optically with each other in the combiner 46c. Thus, the interfered light from the first and second components $S_{48a}'$ and $S_{48b}$ is outputted as the fourth output light $S46b$ (wavelength: $\lambda 1$).

Similar to the delay time $\Delta t41$ given by the first interference unit 43, the delay time $\Delta t42$ given by the second interference unit 46 is set to be equal to or less than 50% of the pulse interval of the input signal light $S_{IN}$ and approximately equal to pulse width of the light $S_{IN}$.

Figure 7C:
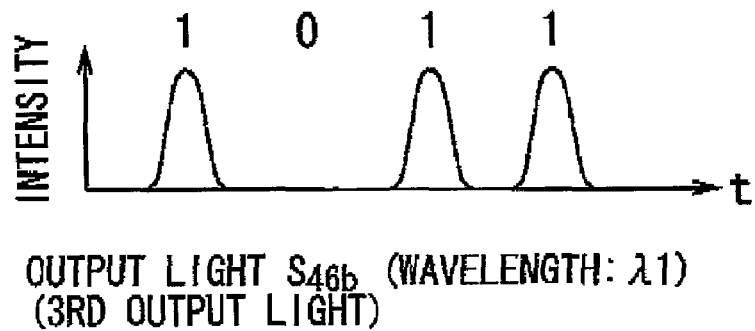

In the all-optical signal regenerator system 60 of the second embodiment, destructive interference occurs between the first and second components $S_{48a}'$ and $4_{48b}$ of the second CW light 348 and these two components $S_{48a}'$ and $S_{48b}$ disappear when the input signal light $S_{IN}$ is at its "1" pulse (i.e., at its high level). Thus, when the input signal light $S_{IN}$ is at its "1" pulse (high level), pulses with a width of $\Delta t42$ are formed in the waveform of the second CW light $S_{48}$ (wavelength, $\lambda 1$). As a result, the fourth output light $S_{46b}$ (wavelength: $\lambda 1$), which is emitted from the second interference unit 46, has a pulsed waveform, as shown in FIG. 7C. This is the same as the input signal light $S_{IN}$.

In the second interference unit 46, because of the sinusoidal transfer function, almost of the intensity noise superposed on the "0" pulse of the input signal light $S_{IN}$ is removed. In other words, the intensity noise superposed on the "0" pulse of the fourth output light $S_{46b}$ is less than the intensity noise superposed on the "1" pulse thereof.

At the same time, almost all the non-uniformity of intensity superposed on the "1" pulse of the input signal light $S_{IN}$ is suppressed.

The noise-suppressing function and the intensity non-uniformity suppressing function given by the second interference unit 46 are effective even if the nonlinear phase shift applied to the second CW light $S_{48}$ in the second semiconductor waveguide 45 is as small as approximately 0.2 π.

The third output light $S_{46a}$ and the fourth output light $S_{46b}$, which are emitted from the second unit 46, are sent to the second band-pass wavelength filter 47. Since the filter 47 blocks the third output light $S_{46a}$ (wavelength: λ2), only the fourth output light $S_{46b}$ (wavelength: λ1) having the waveform shown in FIG. 7C passes through the filter 47.

The fourth output light $S_{46b}$, which has passed through the filter 47, is amplified by the second amplifier 54 and outputted from the output port 52 as an output signal light (light for regeneration) $S_{OUT}$.

Thus, the second-stage optical 2R regeneration operation is completed.

Accordingly, the waveform of the pulsed output signal light $S_{OUT}$ is in the same logic as that of the input signal light $S_{IN}$ applied through the input port 51. The intensity noise and the non-uniformity of intensity superposed on the "1" pulse of the input signal light $S_{IN}$ are suppressed by the first interference unit 43. The intensity noise and the non-uniformity of intensity superposed on the "0" pulse of the input signal light $S_{IN}$ are suppressed by the second interference unit 46. Thus, the intensity noise and the non-uniformity of intensity superposed on the "1" and "0" pulses of the input signal light $S_{IN}$ are effectively suppressed or eliminated.

As explained above, with the all-optical signal regenerator 60 of the second embodiment, desired intensity-noise suppressing function and desired intensity-non-uniformity suppressing function are effectively exhibited or realized, even if the injection currents for the first and second nonlinear semiconductor waveguides 42 and 45 are not increased, and even if the magnitude of the nonlinear phase shift applied to the input signal light $S_{IN}$ is less than π. Thus, the ASE noise is suppressed to thereby improve the S/N in the optical communication system.

Furthermore, the first output light $S_{43a}$ whose waveform is opposite in logic state to the input signal light $S_{IN}$ is generated by the first interference unit 43 and then, the fourth output light $S_{46b}$ whose waveform is the same in logic state as the input signal light $S_{IN}$ is generated by the second interference unit 46. The fourth output light $S_{46b}$ thus generated is amplified and then, outputted as the pulsed output light $S_{OUT}$. As a result, the optical noise superposed on the pulsed input signal light $S_{IN}$ not only at the "0" level with relatively lower intensity but also at the "1" level with relatively higher intensity are suppressed. Thus, the beat noise between the input signal light $S_{IN}$ and the ASE light can be suppressed.

Additionally, as clearly seen from the above description, the wavelength λ1 of the output light (i.e., the output light for regeneration) $S_{OUT}$ is always equalized to that of the input signal light $S_{IN}$.

In addition, with the system 60 of the second embodiment, semiconductor optical amplifiers or light-absorption type semiconductor waveguides may be used as the first and second nonlinear semiconductor waveguides 42 and 45. If semiconductor optical amplifiers are used, there is an additional advantage that the system 60 is applicable even if the level of the input signal light $S_{IN}$ (i.e., the input power) is low. On the other hand, if light-absorption type semiconductor waveguides are used, there is an additional advantage that the system 60 is applicable even if the repetition frequency of the input signal light $S_{IN}$ is high, because these waveguides have high response speed.

If semiconductor optical amplifiers are used as the nonlinear semiconductor waveguides 42 and 45, the amplifiers 53 and 54 may be canceled. This is because semiconductor optical amplifiers have an amplification function.

Instead of the semiconductor optical amplifiers, optical fiber amplifiers may be used for this purpose.

Third Embodiment

Figure 9:
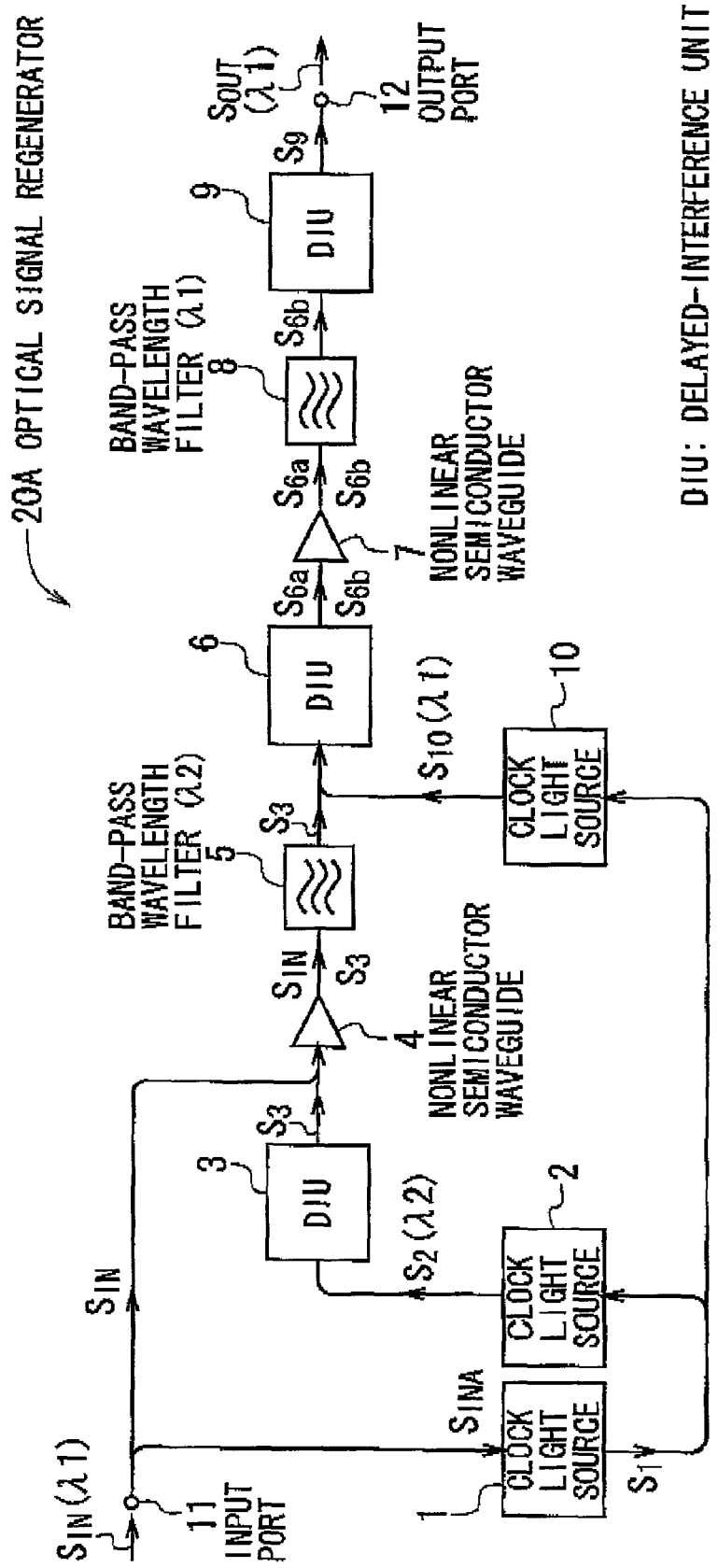
FIG. 9 is a schematic, functional block diagram showing the configuration of an all-optical signal regeneration system according to a third embodiment of the invention, which is a variation of the first embodiment.

FIG. 9 shows an all-optical signal regeneration system 20A according to a third embodiment of the invention. This system 20A has the same configuration as the system 20 of the first embodiment except that the semiconductor optical amplifiers 13 and 14 are removed from the configuration of the system 20 of the first embodiment.

In the third embodiment, there is an additional advantage that the configuration of the system 20A is simplified, along with the same advantages as the system 20 of the first embodiment.

Fourth Embodiment

Figure 10:
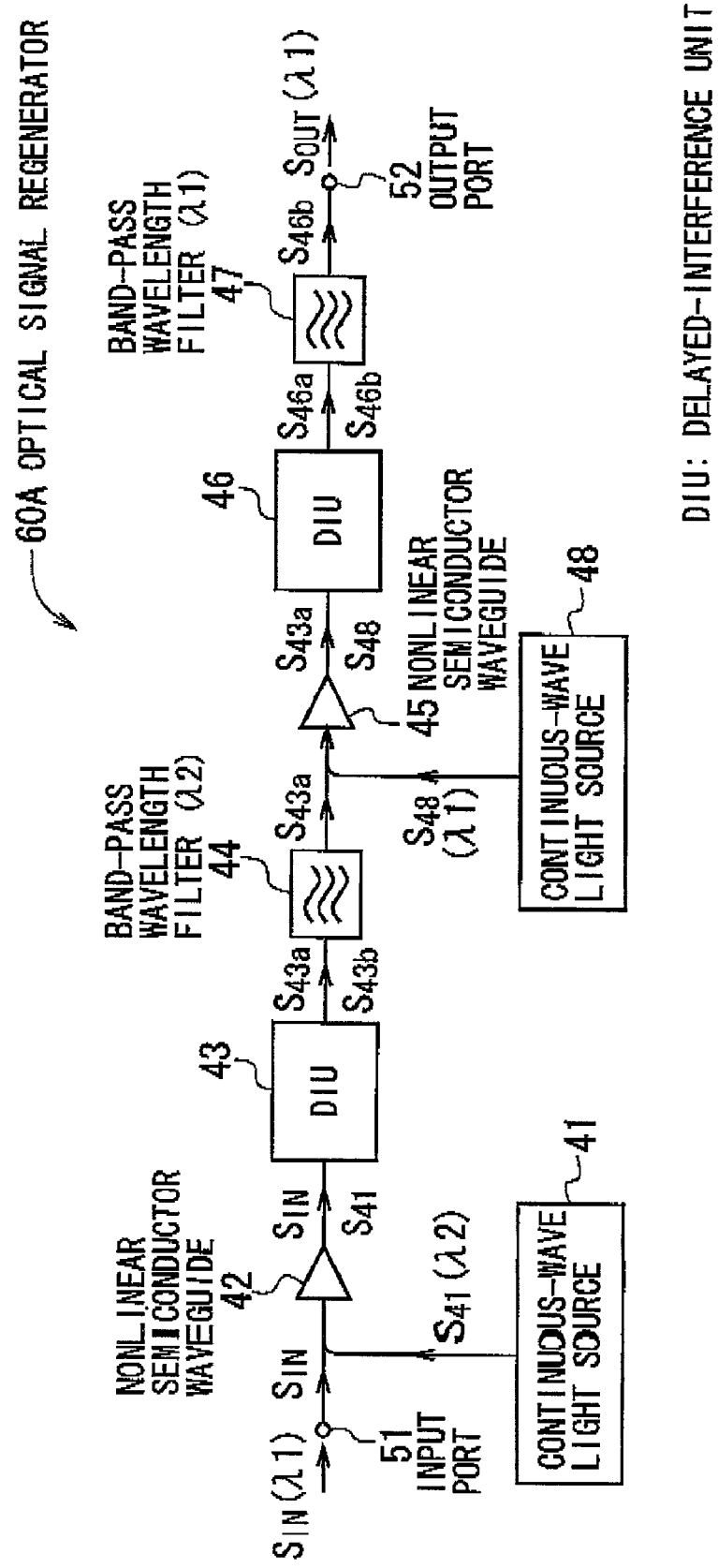
FIG. 10 is a schematic, functional block diagram showing the configuration of an all-optical signal regeneration system according to a fourth embodiment of the invention, which is a variation of the second embodiment.

FIG. 10 shows an all-optical signal regeneration system 60A according to a fourth embodiment of the invention. This system 60A has the same configuration as the system 60 of the second embodiment except that the semiconductor optical amplifiers 53 and 54 are removed from the configuration of the system 60 of the second embodiment.

In the fourth embodiment, there is an additional advantage that the configuration of the system 60A is simplified, along with the same advantages as the system 60 of the second embodiment.

Variations

Needless to say, the present invention is not limited to the above-described first and second embodiments. Any change or modification may be added to the embodiment within the spirit of the invention.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A method for all-optical signal regeneration, comprising:
   (a) inputting pulsed input signal light with a first wavelength into first nonlinear semiconductor waveguide means to cause nonlinear change of refractive index therein;
   (b) generating first pulsed clock light and second pulsed clock light by extracting optical clock from the input signal light;
     the first clock light having a second wavelength different from the first wavelength;
     the second clock light having the first wavelength;
   (c) dividing the first optical clock into a first component and a second component and generating a first delay time between the first component and the second component, thereby generating first pulsed output light including the first component and the second component;

the first output light having the second wavelength;

(d) applying the first output light to the first nonlinear semiconductor waveguide means to cause nonlinear phase shift in the first output light using the nonlinear change of refractive index caused by the input signal light;

(e) applying the first output light having the nonlinear phase shift caused by the first nonlinear semiconductor waveguide means and the second clock light to first delayed-interference means, thereby generating second pulsed output light from the first output light and third pulsed output light from the second clock light;

the second output light having the second wavelength and an opposite logic to the input signal light;

the third output light having the first wavelength;

(f) applying the second output light to second nonlinear semiconductor waveguide means to cause nonlinear change of refractive index therein;

(g) applying the third output light into the second nonlinear semiconductor waveguide means to cause nonlinear phase shift in the third output light using the nonlinear change of refractive index of the second nonlinear semiconductor waveguide means caused by the second output light;

(h) applying the third output light having the nonlinear phase shift caused to the second delayed-interference means, thereby generating fourth pulsed output light; the fourth output light having the first wavelength and a same logic as the input signal light; and (i) generating pulsed light for regeneration using the fourth output light.

2. The method according to claim 1, wherein input timing of the input signal light into the first nonlinear semiconductor waveguide means is set to fall between a pulse of the first component of the first output light and an adjoining pulse of the second component thereof.

3. The method according to claim 1, wherein in the first delayed-interference means;

the first output light having the phase shift and the second wavelength is divided into the first and second components and then, the first delay time is generated between the first and second components;

thereafter, the first and second components are combined together to induce optical interference between the first and second components, thereby generating the second output light, the second clock light having the first wavelength is divided into third and fourth components and then, the first delay time is generated between the third and fourth components;

thereafter, the third and fourth components are combined together to induce optical interference between the third and fourth components, thereby generating the third output light; and wherein in the second delayed-interference means; the third output light having the phase shift and the first wavelength is divided into fifth and sixth components and then, a second delay time is generated between the fifth and sixth components;

thereafter, the fifth and sixth components are combined together to induce optical interference between the fifth and sixth components, thereby generating the fourth output light.

4. The method according to claim 1, wherein the input signal light, which has been inputted into the first nonlinear semiconductor waveguide means to cause the change of refractive index, is removed with a first wavelength filter prior to entering the first delayed-interference means.

5. The method according to claim 1, wherein the second output light, which has been inputted into the second nonlinear semiconductor waveguide means to cause the change of refractive index, is removed with a second wavelength filter prior to entering the second delay interference means.

6. The method according to claim 1, wherein a semiconductor optical amplifier is used as at least one of the first nonlinear semiconductor waveguide means and the second nonlinear semiconductor waveguide means.

7. The method according to claim 1, wherein a light-absorption type semiconductor waveguide is used as at least one of the first nonlinear semiconductor waveguide means and the second nonlinear semiconductor waveguide means.

8. A system for all-optical signal regeneration, comprising:

(a) a first clock light generator for generating first pulsed clock light and a second clock light generator for generating second pulsed clock light, by extracting optical clock from input signal light with a first wavelength;

the first clock light having a second wavelength different from the first wavelength;

the second clock light having the first wavelength;

(b) a first output light generator for generating a first pulsed output light;

the first output light generator dividing the first clock light into a first component and a second component and generating a first delay time between the first component and the second component, thereby generating the first output light including the first component and the second component;

the first output light having the second wavelength;

(c) first nonlinear semiconductor waveguide means for causing nonlinear phase shift in the first output light by using nonlinear change of refractive index caused by input of the input signal light;

(d) first delayed-interference means for generating second pulsed output light from the first output light and third pulsed output light from the second clock light by receiving the first output light having the nonlinear phase shift caused by the first nonlinear semiconductor waveguide means and the second clock light;

the second output light having the second wavelength and an opposite logic to the input signal light;

the third output light having the first wavelength;

(e) second nonlinear semiconductor waveguide means for causing nonlinear phase shift in the third output light by using nonlinear change of refractive index caused by input of the second output light; and (f) second delayed-interference means for generating fourth pulsed output light by receiving the third output light having the nonlinear phase shift caused by the second nonlinear semiconductor waveguide means;

the fourth output light having the first wavelength and a same logic as the input signal light;

wherein pulsed light for regeneration is generated using the fourth output light.

9. The system according to claim 8, wherein input timing of the input signal light into the first nonlinear semiconductor waveguide means is set to fall between a pulse of the first component of the first output light and an adjoining pulse of the second component thereof.

10. The system according to claim 8, wherein
in the first delayed-interference means;
the first output light having the phase shift and the second wavelength is divided into the first and second components and then, the first delay time is generated between the first and second components;
thereafter, the first and second components are combined together to induce optical interference between the first and second components, thereby generating the second output light;
the second clock light having the first wavelength is divided into third and fourth components and then, the first delay time is generated between the third and fourth components;
thereafter, the third and fourth components are combined together to induce optical interference between the third and fourth components, thereby generating the third output light; and wherein
in the second delayed-interference means;
the third output light having the phase shift and the first wavelength is divided into fifth and sixth components and then, a second delay time is generated between the fifth and sixth components;
thereafter, the fifth and sixth components are combined together to induce optical interference between the fifth and sixth components, thereby generating the fourth output light.

11. The system according to claim 8, wherein the input signal light, which has been inputted into the first nonlinear semiconductor waveguide means to cause the change of refractive index, is removed with a first wavelength filter prior to entering the first delayed-interference means.

12. The system according to claim 8, wherein the second output light, which has been applied to the second nonlinear semiconductor waveguide means to cause the change of refractive index, is removed with a second wavelength filter prior to entering the second delayed-interference means.

13. The system according to claim 8, wherein a semiconductor optical amplifier is used as at least one of the first nonlinear semiconductor waveguide means and the second nonlinear semiconductor waveguide means.

14. The system according to claim 8, wherein a light absorption type semiconductor waveguide is used as at least one of the first nonlinear semiconductor waveguide means and the second nonlinear semiconductor waveguide means.

15. A method for all-optical signal regeneration, comprising:
(a) inputting pulsed input signal light with a first wavelength into first nonlinear semiconductor waveguide means to cause nonlinear change of refractive index therein;
(b) applying first continuous-wave light to the first nonlinear semiconductor waveguide means to thereby apply nonlinear phase shift to the first continuous-wave light using the nonlinear change of refractive index caused by the input signal;
the first continuous-wave light having a second wavelength different from the first wavelength;
(c) applying the first continuous wave light having the phase shift caused by the first nonlinear semiconductor waveguide means and the input signal light to a first delayed-interference means, thereby generating distorted continuous-wave light with the second wavelength;
the distorted continuous-wave light a pulse-like continuous waveform whose logic is opposite to the input signal light;
(d) applying the distorted continuous-wave light to second nonlinear semiconductor waveguide means to thereby cause nonlinear change of refractive index therein;
(e) applying a second continuous-wave light with the first wavelength to the second nonlinear semiconductor waveguide means, thereby applying nonlinear phase shift to the second continuous-wave light using the nonlinear change of refractive index caused by the distorted continuous-wave light in the second nonlinear semiconductor waveguide means;
(f) applying the second continuous-wave light having the phase shift caused by the second nonlinear semiconductor waveguide means and the distorted continuous-wave light to a second delayed-interference means, thereby generating pulsed output light with the first wavelength;
the output light having a same logic as the input signal light; and
(g) generating pulsed light for regeneration using the output light.

16. The method according to claim 15, wherein
in the first delayed-interference means;
the first continuous-wave light having the phase shift caused is divided into the first and second components and then, the first delay time is generated between the first and second components;
thereafter, the first and second components are combined together to induce optical interference between them, thereby generating the distorted continuous-wave light;
in the second delayed-interference means;
the second continuous-wave light having the phase shift caused is divided into third and fourth components and then, a second delay time is generated between them;
thereafter, the third and fourth components are combined together to induce optical interference between the third and fourth components, thereby generating the output light.

17. The method according to claim 15, wherein the input signal light, which has been inputted into the first nonlinear semiconductor waveguide means to cause the change of refractive index therein, is removed with a first wavelength filter prior to entering the first delay interference means.

18. The method according to claim 15, wherein the distorted continuous-wave light, which has been applied to the second nonlinear semiconductor waveguide means to cause the change of refractive index therein, is removed with a second wavelength filter prior to entering the second delay interference means.

19. The method according to claim 15, wherein a semiconductor optical amplifier is used as at least one of the first nonlinear semiconductor waveguide means and the second nonlinear semiconductor waveguide means.

20. The method according to claim 15, wherein a light absorption type semiconductor waveguide is used as at least one of the first nonlinear semiconductor waveguide means and the second nonlinear semiconductor waveguide means.

21. A system for all-optical signal regeneration, comprising:
(a) first nonlinear semiconductor waveguide means for causing nonlinear change of refractive index therein by receiving pulsed input signal light with a first wavelength;
(b) a first continuous-wave light generator for generating a first continuous-wave light and a second continuous-wave light generator for generating a second continuous-wave light;

the first continuous-wave light having a second wavelength different from the first wavelength;

the second continuous-wave light having the first wavelength;

(c) first delayed-interference means for generating distorted continuous-wave light by receiving the first continuous-wave light having the phase shift caused by the first nonlinear semiconductor waveguide means and the input signal light;

the distorted continuous-wave light having the second wavelength and a pulse-like continuous waveform whose logic is opposite to the input signal light;

(d) second nonlinear semiconductor waveguide means for causing nonlinear change of refractive index therein by receiving the distorted continuous-wave light; and (e) second delayed-interference means for generating pulsed output light by receiving the distorted continuous-wave light and the second continuous-wave light having the phase shift caused by the second nonlinear semiconductor waveguide means;

the output light having the first wavelength and a pulse-like continuous waveform whose logic is a same as the input signal light;

wherein pulsed light for regeneration is generated using the output light.

22. The system according to claim 21, wherein in the first delayed-interference means;

the first continuous-wave light having the phase shift applied is divided into the first and second components and then, the first delay time is generated between the first and second components;

thereafter, the first and second components are combined together to induce optical interference between the first and second components, thereby generating the distorted continuous-wave light; and wherein in the second delayed-interference means;

the second continuous-wave light having the phase shift applied is divided into third and fourth components and then, a second delay time is generated between the third and fourth components;

thereafter, the third and fourth components are combined together to induce optical interference between the third and fourth components, thereby generating the output light.

23. The system according to claim 21, wherein the input signal light, which has been inputted into the first nonlinear semiconductor waveguide means to cause the change of refractive index, is removed with a first wavelength filter prior to entering the first delay interference means.

24. The system according to claim 21, wherein the distorted continuous-wave lights which has been applied to the second nonlinear semiconductor waveguide means to cause the change of refractive index, is removed with a second wavelength filter prior to entering the second delay interference means.

25. The system according to claim 21, wherein a semiconductor optical amplifier is used as at least one of the first nonlinear semiconductor waveguide means and the second nonlinear semiconductor waveguide means.

26. The system according to claim 21, wherein a light absorption type semiconductor waveguide is used as at least one of the first nonlinear semiconductor waveguide means and the second nonlinear semiconductor waveguide means.

* * * * *